US010106225B1

(12) United States Patent
Massicotte et al.

(10) Patent No.: US 10,106,225 B1
(45) Date of Patent: Oct. 23, 2018

(54) HULL FOR A WATERCRAFT

(71) Applicant: BOMBARDIER RECREATIONAL PRODUCTS INC., Valcourt (CA)

(72) Inventors: Alain Massicotte, Sherbrooke (CA); Lonnie Lieb, West Melbourne, FL (US); Keith Allen Spade, McCall, ID (US)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/615,301

(22) Filed: Jun. 6, 2017

Related U.S. Application Data

(63) Continuation-in-part of application No. 14/841,067, filed on Aug. 31, 2015.

(60) Provisional application No. 62/043,856, filed on Aug. 29, 2014.

(51) Int. Cl.
| | |
|---|---|
| *B63B 1/22* | (2006.01) |
| *B63B 1/04* | (2006.01) |
| *B63B 1/08* | (2006.01) |
| *B63B 1/32* | (2006.01) |
| *B63B 35/00* | (2006.01) |
| *B63B 1/00* | (2006.01) |

(52) U.S. Cl.
CPC ............. *B63B 1/04* (2013.01); *B63B 1/08* (2013.01); *B63B 1/22* (2013.01); *B63B 1/32* (2013.01); *B63B 1/00* (2013.01); *B63B 35/00* (2013.01)

(58) Field of Classification Search
CPC .... B63B 1/04; B63B 1/32; B63B 1/08; B63B 1/22; B63B 1/00; B63B 35/00
USPC .............. 114/279, 280, 282, 284, 285
See application file for complete search history.

(56) References Cited

U.S. PATENT DOCUMENTS

| | | | |
|---|---|---|---|
| 1,752,406 A | 4/1930 | Wetch | |
| 1,805,131 A | 5/1931 | Donaldson | |
| 2,265,206 A | 12/1941 | Stampfl | |
| 2,617,377 A | 11/1952 | Evans | |
| 2,776,637 A * | 1/1957 | Chadwick | B63B 3/68 114/219 |
| 3,016,864 A | 1/1962 | Woodfield | |
| 3,158,129 A | 11/1964 | Mauer | |
| 3,190,587 A | 6/1965 | Fries | |

(Continued)

FOREIGN PATENT DOCUMENTS

| | | |
|---|---|---|
| WO | 1992012892 A1 | 8/1992 |
| WO | 1997036780 A1 | 10/1997 |
| WO | 1997048593 A1 | 12/1997 |

*Primary Examiner* — Anthony D Wiest
(74) *Attorney, Agent, or Firm* — BCF LLP

(57) ABSTRACT

A hull for a watercraft and a watercraft disclosed, the hull including a hull body having a first recess surface defining a first recess, and a second recess surface defining a second recess; a first hull panel disposed in the first recess, a front portion of the first hull panel being movable between a first and second position; a second hull panel disposed in the second recess, a front portion of the second hull panel being movable between a third and fourth position; a first biasing member biasing the front portion of the first hull panel toward the first position; a second biasing member biasing the front portion of the second hull panel toward the third position; a first stopper for the first hull panel; a second stopper for the second hull panel; and a stabilizing bar for transferring motion between the first hull panel and the second hull panel.

18 Claims, 20 Drawing Sheets

(56) References Cited

U.S. PATENT DOCUMENTS

| | | | |
|---|---|---|---|
| 3,230,918 A | 1/1966 | Compton | |
| 3,401,663 A | 9/1968 | Yost | |
| 3,528,380 A | 9/1970 | Yost | |
| 3,559,222 A | 2/1971 | Walker | |
| 3,561,389 A | 2/1971 | Hunt | |
| 3,636,907 A | 1/1972 | Scarritt | |
| 3,670,684 A | 6/1972 | Helker | |
| 3,758,064 A | 9/1973 | Sawaki | |
| 3,948,206 A | 4/1976 | Tyler | |
| 3,987,743 A | 10/1976 | Pensel | |
| 3,998,176 A | 12/1976 | Stout et al. | |
| 4,101,997 A | 7/1978 | Tyler | |
| 4,351,262 A | 9/1982 | Matthews | |
| 4,494,477 A | 1/1985 | Matthews | |
| 4,690,094 A | 9/1987 | Taylor | |
| 4,893,579 A | 1/1990 | Kobayashi | |
| 4,909,176 A | 3/1990 | Kobayashi | |
| 4,945,852 A | 8/1990 | Kobayashi | |
| 5,011,109 A | 4/1991 | Nagata | |
| 5,050,517 A | 9/1991 | Kobayashi | |
| 5,107,783 A | 4/1992 | Magazzu | |
| 5,228,404 A | 7/1993 | Gibbs | |
| 5,237,950 A | 8/1993 | Abe et al. | |
| 5,309,861 A | 5/1994 | Mardikian | |
| 5,390,623 A * | 2/1995 | MacKaness | B63B 1/22 114/282 |
| 5,465,678 A | 11/1995 | Ekman | |
| 5,542,371 A | 8/1996 | Harvey et al. | |
| 5,603,281 A | 2/1997 | Harvey et al. | |
| 5,647,296 A | 7/1997 | Pasanen | |
| 5,701,837 A | 12/1997 | Harvey | |
| 5,957,072 A | 9/1999 | Hattori | |
| 6,003,465 A | 12/1999 | Khachatrian et al. | |
| 6,019,054 A | 2/2000 | Hattori et al. | |
| 6,152,062 A | 11/2000 | Hattori | |
| 6,158,376 A | 12/2000 | Vorus | |
| 6,176,190 B1 | 1/2001 | Ozga | |
| 6,182,596 B1 | 2/2001 | Johnson | |
| 6,223,674 B1 | 5/2001 | Wyman | |
| 6,477,976 B2 | 11/2002 | Van Gelder | |
| 6,684,807 B1 | 2/2004 | Smith | |
| 6,786,172 B1 | 9/2004 | Loffler | |
| 6,880,483 B2 | 4/2005 | Fedders | |
| 6,892,666 B1 | 5/2005 | Plante et al. | |
| 7,004,091 B2 | 2/2006 | Adamczyk et al. | |
| 7,124,703 B2 | 10/2006 | Richard et al. | |
| 7,343,869 B2 | 3/2008 | Futaki | |
| 7,357,090 B2 | 4/2008 | Spade et al. | |
| 7,467,594 B1 | 12/2008 | Duquette et al. | |
| 7,617,789 B2 | 11/2009 | Simard et al. | |
| 7,699,010 B2 | 4/2010 | Spade et al. | |
| 7,699,011 B2 | 4/2010 | Duquette et al. | |
| 7,748,334 B2 | 7/2010 | Ross et al. | |
| 7,849,808 B2 | 12/2010 | Duquette et al. | |
| 7,874,257 B2 | 1/2011 | Duquette et al. | |
| 7,918,173 B2 | 4/2011 | Duquette et al. | |
| 8,132,524 B2 | 3/2012 | Pereira | |
| 8,245,657 B2 | 8/2012 | Ross et al. | |
| 8,347,802 B2 | 1/2013 | Pereira | |
| 8,783,200 B1 * | 7/2014 | Meyers | B63B 1/22 114/284 |
| 2008/0029007 A1 | 2/2008 | Muller | |
| 2012/0017820 A1 | 1/2012 | Pereira | |
| 2014/0026799 A1 | 1/2014 | Kalil | |

\* cited by examiner

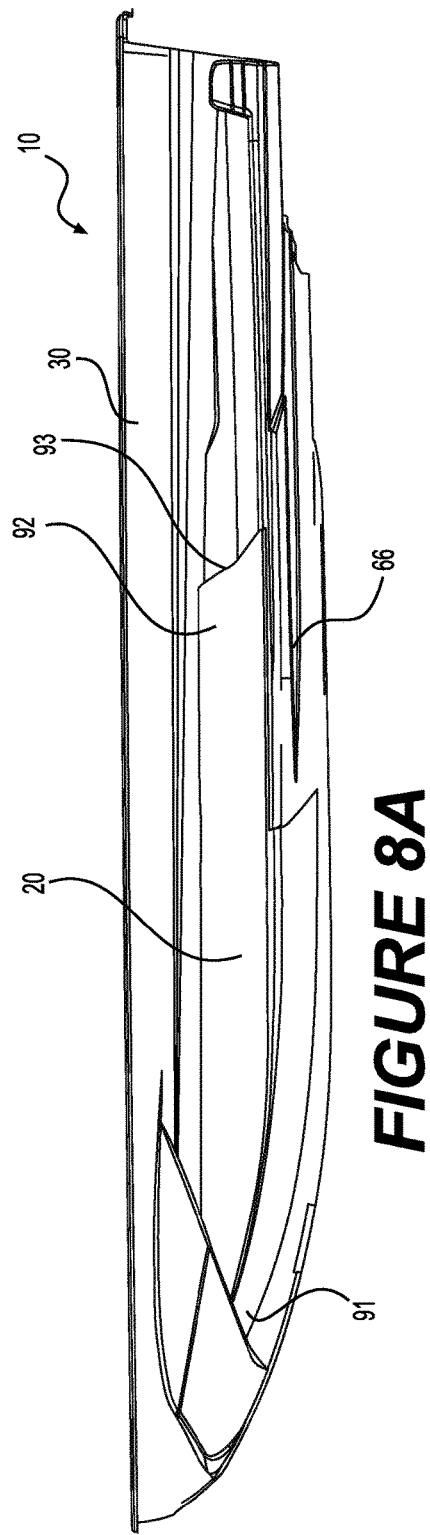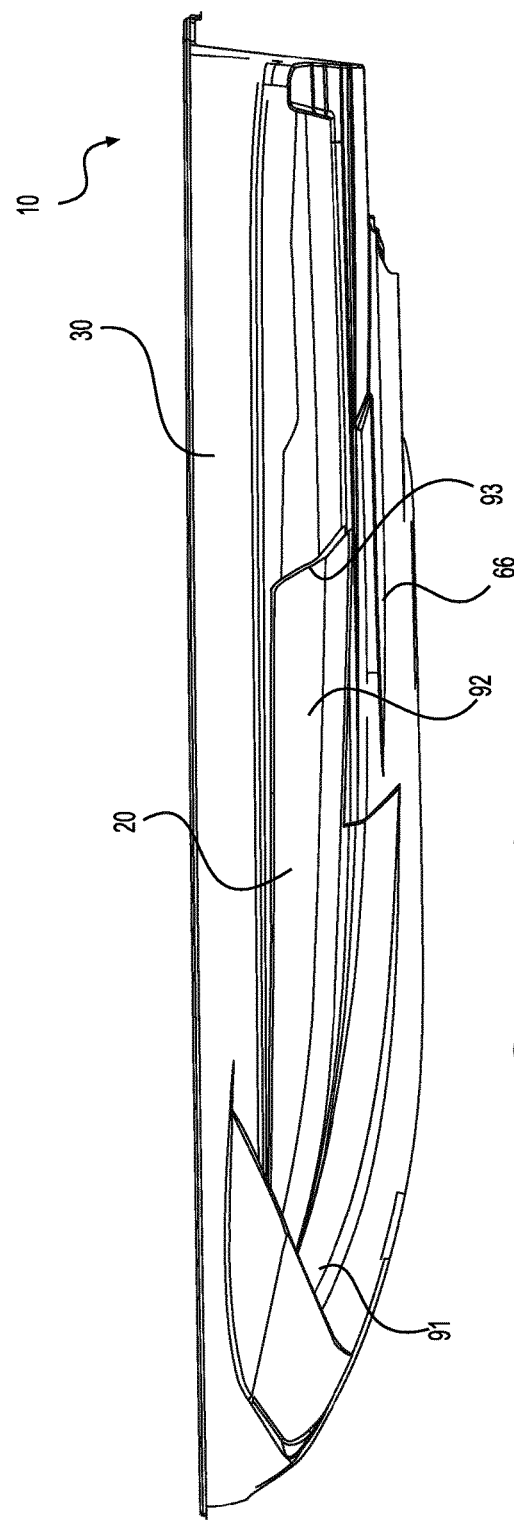

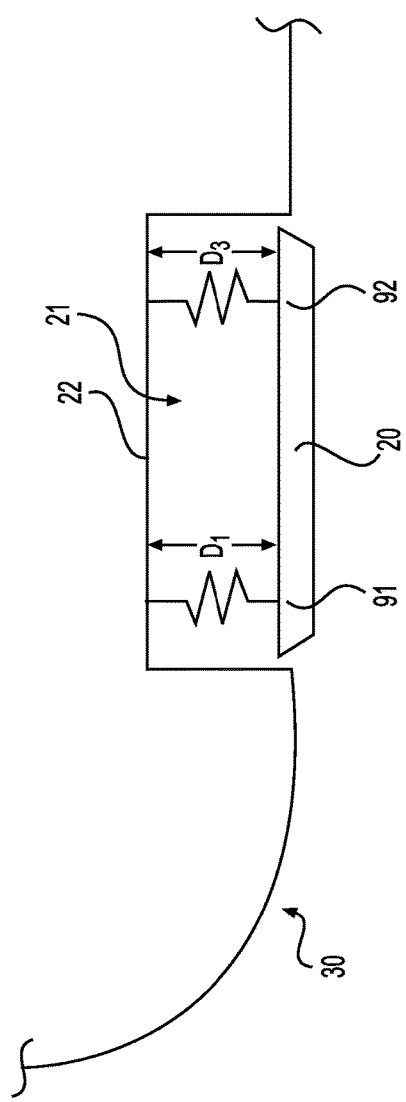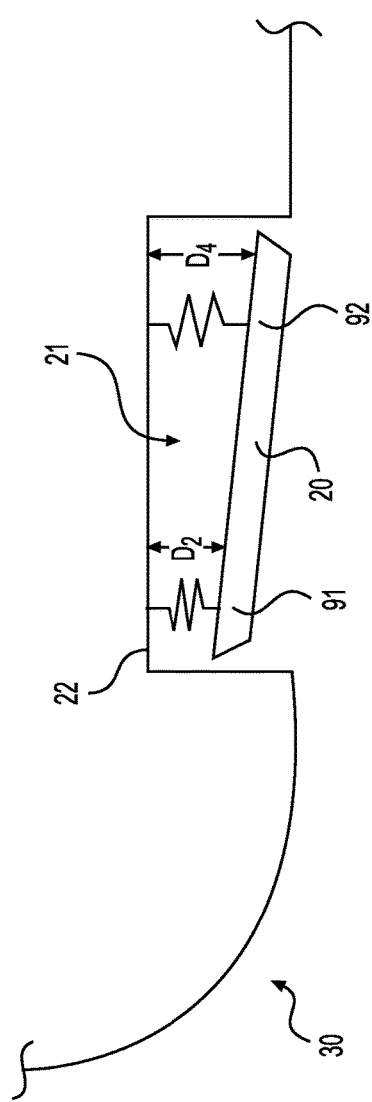

HULL FOR A WATERCRAFT

CROSS-REFERENCE

The present application is a continuation-in-part of U.S. patent application Ser. No. 14/841,067, filed on Aug. 31, 2015, which claims priority to U.S. Provisional Patent Application No. 62/043,856, filed on Aug. 29, 2014, the entirety of both of which is incorporated herein by reference.

FIELD OF THE TECHNOLOGY

The present technology relates to a hull for a watercraft.

BACKGROUND

Personal watercraft (PWCs) have become very popular in recent years for recreational use and for use as transportation in coastal communities. For example, water jet propelled watercraft offer high performance, good acceleration and handling, and shallow-water operation. Accordingly, personal watercraft, which typically employ water jet propulsion units, have become popular, especially in resort areas. As the use of PWCs has increased, a desire for improved comfort for operators and riders of these PWCs has also increased.

Chop is a term for small waves which, while not preventing operators and riders from using their watercraft, carry enough force to cause discomfort while riding due to increased vibration. This effect can be especially noticeable at the front (bow) of the watercraft as the vessel intercepts small waves and wakes and shocks from the chop is transferred to the operator and any passengers through the hull.

In view of the foregoing, a desire has developed for a watercraft with a hull body that provides a solution to the inconvenience described above. In order to address this desire, hull adaptations have been developed.

U.S. Pat. No. 5,647,296 teaches the addition of a shock damper including an impact plate mounted to the bow of a boat for damping impacts generated by waves. The shock damper has a structure similar to an external ski that attaches to the hull, which flexes to absorb wave shocks and lifts the bow out of the water preventing wave energy from striking the bow directly. While providing a method for cushioning and avoiding the landing shocks from chop and small waves, the additional structure external to the hull changes some basic characteristics of the watercraft. The modification taught first changes the manner in which the watercraft must be handled for transport, as the external shock damper may be damaged if the watercraft is loaded onto a standard trailer. As the shock absorber works in part by lifting the bow up away from chop and small waves, this will also affect the manner in which the watercraft handles as it is piloted.

With the drawback as described above, the system taught does not satisfactorily address the problems of chop without materially affecting the original structural form and handling of the watercraft. Therefore, there is still a desire for a watercraft having a hull that provides improved rider comfort when presented with conditions of chop while not effectively diminishing the overall watercraft quality or handling.

SUMMARY

It is an object of the present technology to ameliorate at least some of the inconveniences present in the prior art.

According to a first broad aspect of the present technology, there is provided a hull for a watercraft. The hull includes a hull body having a first recess surface defining a first recess, and a second recess surface defining a second recess; a first hull panel disposed at least in part in the first recess, a front portion of the first hull panel being movable between a first position and a second position: in the first position, the front portion of the first hull panel being at a first distance from the first recess surface, in the second position, the front portion of the first hull panel being at a second distance from the first recess surface, and the first distance being greater than the second distance; a second hull panel disposed at least in part in the second recess, a front portion of the second hull panel being movable between a third position and a fourth position: in the third position, the front portion of the second hull panel being at a third distance from the second recess surface, in the fourth position, the front portion of the second hull panel being at a fourth distance from the second recess surface, and the third distance being greater than the fourth distance; a first biasing member biasing the front portion of the first hull panel toward the first position; a second biasing member biasing the front portion of the second hull panel toward the third position; at least one first stopper preventing the front portion of the first hull panel from moving outwards of the first recess past the first position; at least one second stopper preventing the front portion of the second hull panel from moving outwards of the second recess past the third position; and a stabilizing bar for transferring motion between the first hull panel and the second hull panel, the stabilizing bar having a first end portion and a second end portion and being connected to: the hull body between the first end portion and the second end portion, the first hull panel near the first end portion, and the second hull panel near the second end portion.

In some implementations, in the first position, at least a portion of the first hull panel is aligned with portions of the hull body defining a first contour of the first recess; and in the third position, at least a portion of the second hull panel is aligned with portions of the hull body defining a second contour of the second recess.

In some implementations, in the first position, at least a lateral side portion of the first hull panel is aligned with portions of the hull body defining a first contour of the first recess; and in the third position, at least a lateral side portion of the second hull panel is aligned with portions of the hull body defining a second contour of the second recess.

In some implementations, a rear end of the first hull panel is joined with a portion of the hull body adjacent to a rear end of the first recess; and a rear end of the second hull panel is joined with a portion of the hull body adjacent to a rear end of the second recess.

In some implementations, the stabilizer bar includes at least a generally U-shaped torsion bar pivotably connected to the hull body.

In some implementations, the hull further includes a first rigid member connecting a first end portion of the U-shaped torsion bar to the first hull panel; and a second rigid member connecting a second end portion of the U-shaped torsion bar to the second hull panel.

In some implementations, the first rigid member extends through the first recess surface; and the second rigid member extends through the second recess surface.

In some implementations, the hull further includes a first boot disposed on the first rigid member and connected to the hull body; and a second boot disposed on the second rigid member and connected to the hull body.

In some implementations, the first and second biasing members include at least a resilient material.

In some implementations, the resilient material of the first biasing member is disposed between and connected to the first recess surface and the first hull panel, a lateral surface of the resilient material of the first biasing member generally following an outer edge of the first hull panel; and the resilient material of the second biasing member is disposed between and connected to the second recess surface and the second hull panel, a lateral surface of the resilient material of the second biasing member generally following an outer edge of the second hull panel.

In some implementations, the resilient material of the first and second biasing members is a closed-cell foam.

In some implementations, the first and second hull panels are flexible.

In some implementations, the first and second biasing members include at least an air spring.

In some implementations, the first and second biasing members include at least a spring and damper system.

In some implementations, the first and second biasing members include at least a resilient mount shock absorber.

In some implementations, the hull further includes a rearward portion of the first hull panel rearward of the front portion of the first hull panel and being movable between a fifth position and a sixth position: in the fifth position, the rearward portion of the first hull panel is at a fifth distance from the first recess surface, in the sixth position, the rearward portion of the first hull panel is at a sixth distance from first recess surface, and the fifth distance is greater than the sixth distance; and a rearward portion of the second hull panel rearward of the front portion of the second hull panel and being movable between a seventh position and an eighth position: in the seventh position, the rearward portion of the second hull panel is at a seventh distance from the second recess surface, in the eighth position, the rearward portion of the second hull panel is at an eighth distance from second recess surface, and the seventh distance is greater than the eighth distance.

In some implementations, a difference between the first distance and the second distance is greater than a difference between the fifth distance and the sixth distance; and a difference between the third distance and the fourth distance is greater than a difference between the seventh distance and the eighth distance.

According to another broad aspect of the present technology, there is provided a watercraft including a hull including: a hull body having: a first recess surface defining a first recess, and a second recess surface defining a second recess; a first hull panel disposed at least in part in the first recess, a front portion of the first hull panel being movable between a first position and a second position: in the first position, the front portion of the first hull panel being at a first distance from the first recess surface, in the second position, the front portion of the first hull panel being at a second distance from the first recess surface, and the first distance being greater than the second distance; a second hull panel disposed at least in part in the second recess, a front portion of the second hull panel being movable between a third position and a fourth position: in the third position, the front portion of the second hull panel being at a third distance from the second recess surface, in the fourth position, the front portion of the second hull panel being at a fourth distance from the second recess surface, and the third distance being greater than the fourth distance; a first biasing member biasing the front portion of the first hull panel toward the first position; a second biasing member biasing the front portion of the second hull panel toward the third position; at least one first stopper preventing the front portion of the first hull panel from moving outwards of the first recess past the first position; at least one second stopper preventing the front portion of the second hull panel from moving outwards of the second recess past the third position; and a stabilizing bar for transferring motion between the first hull panel and the second hull panel, the stabilizing bar having a first end portion and a second end portion and being connected to the hull body between the first end portion and the second end portion, the first hull panel near the first end portion, and the second hull panel near the second end portion; a deck disposed on the hull; a propulsion system connected to at least one of the hull and the deck; and a motor operatively connected to the propulsion system.

According to another broad aspect of the present technology, there is provided a hull for a watercraft having a hull body having at least one recess surface defining at least one recess, at least one hull panel disposed at least in part in the at least one recess, a front portion of the at least one hull panel being movable between a first position and a second position. In the first position, the front portion of the at least one hull panel is at a first distance from the at least one recess surface, in the second position the front portion of the at least one hull panel is at a second distance from the at least one recess surface, and the first distance is greater than the second distance. The hull also includes a biasing member biasing the front portion of the at least one hull panel toward the first position and at least one stopper preventing the front portion of the at least one hull panel from moving outwards of the at least one recess past the first position.

In some implementations of the hull, in the first position at least a portion of the at least one hull panel is aligned with portions of the hull body defining a contour of the at least one recess.

In some implementations of the hull, in the first position at least a lateral side portion of the at least one hull panel is aligned with portions of the hull body defining a contour of the at least one recess.

In some implementations of the hull, a rear end of the at least one hull panel is joined with a portion of the hull body adjacent to a rear end of the at least one recess.

In some implementations of the hull, the at least one hull panel defines a portion of a keel of the hull.

In some implementations of the hull, the at least one recess is a first hull recess and a second hull recess, the at least one hull panel is a first hull panel, a second hull panel, the first hull panel is disposed in the first hull recess, and the second hull panel is disposed in the second hull recess.

In some implementations of the hull, the biasing member is a spring and damper system.

In some implementations of the hull, the biasing member is an air spring.

In some implementations of the hull, the at least one hull panel is flexible.

In some implementations of the hull, the at least one stopper is formed at least in part by a portion of the hull panel overlapping the hull body.

In some implementations of the hull, the portion of the hull panel overlapping the hull body is a portion nearest a keel of the hull body.

In some implementations of the hull, the at least one stopper is formed at least in part by a portion of the hull body overlapping the hull panel.

In some implementations of the hull, the portion of the hull body overlapping the hull panel is a portion near a keel of the hull body.

In some implementations of the hull, a rearward portion of the at least one hull panel is movable between a third position and a fourth position. In the third position, the rearward portion of the at least one hull panel is at a third distance from the at least one recess surface, in the fourth position, the rearward portion of the at least one hull panel is at a fourth distance from the at least one recess surface and the third distance is greater than the fourth distance.

In some implementations of the hull, a difference between the first distance and the second distance is greater than a difference between the third distance and the fourth distance.

In some implementations of the hull, the biasing member includes at least a resilient material.

In some implementations of the hull, the resilient material is disposed between and connected to the at least one recess surface and the at least one hull panel and a lateral surface of the resilient material generally follows an outer edge of the at least one hull panel.

In some implementations of the hull, the resilient material is a closed-cell foam.

According to another broad aspect of the present technology, there is provided a hull for a watercraft having a hull body having at least one recess surface defining at least one recess, at least one hull panel disposed at least in part in the at least one recess, a front portion of the at least one hull panel being movable between a first position and a second position. In the first position, the front portion of the at least one hull panel is at a first distance from the at least one recess surface, in the second position, the front portion of the at least one hull panel is at a second distance from the at least one recess surface, the first distance being greater than the second distance, and in the first position, at least a portion of the at least one hull panel is aligned with portions of the hull body defining a contour of the at least one recess. The hull further has a biasing member biasing the front portion of the at least one hull panel toward the first position.

In some implementations of the hull, in the first position, at least a front portion of the at least one hull panel is aligned with portions of the hull body defining a contour of the at least one recess.

In some implementations of the hull, the at least one recess is a first hull recess and a second hull recess, the at least one hull panel is a first hull panel and a second hull panel, the first hull panel is disposed in the first hull recess and the second hull panel is disposed in the second hull recess.

In some implementations of the hull, the biasing member is a spring and damper system.

In some implementations of the hull, the biasing member is an air spring.

In some implementations of the hull, the at least one hull panel is flexible.

In some implementations of the hull, a rear portion of the at least one hull panel is movable between a third position and a fourth position. In the third position, the rear portion of the at least one hull panel is at a third distance from the at least one recess surface, in the fourth position, the rear portion of the at least one hull panel is at a fourth distance from the at least one recess surface and the third distance is greater than the fourth distance.

In some implementations of the hull, a difference between the first distance and the second distance is greater than a difference between the third distance and the fourth distance.

In some implementations of the hull, the biasing member includes at least a resilient material.

In some implementations of the hull, the resilient material is disposed between and connected to the at least one recess surface and the at least one hull panel and a lateral surface of the resilient material generally follows an outer edge of the at least one hull panel.

In some implementations of the hull, the resilient material is a closed-cell foam.

According to another broad aspect of the present technology, there is provided a hull for a watercraft having a hull body having at least one recess surface defining at least one recess, at least one hull panel disposed at least in part in the at least one recess, a front portion of the at least one hull panel being movable between a first position and a second position. In the first position, the front portion of the at least one hull panel is at a first distance from the at least one recess surface, in the second position, the front portion of the at least one hull panel is at a second distance from the at least one recess surface, and the first distance is greater than the second distance. The hull further includes a rearward portion of the at least one hull panel being movable between a third position and a fourth position: in the third position, the rearward portion of the at least one hull panel being at a third distance from the at least one recess surface, in the fourth position, the rearward portion of the at least one hull panel being at a fourth distance from the at least one recess surface, the third distance being greater than the fourth distance where a difference between the first distance and the second distance being greater than a difference between the third distance and the fourth distance, as well as a biasing member biasing the front portion of the at least one hull panel toward the first position.

In some implementations of the hull, in the first position, at least a front portion of the at least one hull panel is aligned with portions of the hull body defining a contour of the at least one recess.

In some implementations of the hull, the at least one recess is a first hull recess and a second hull recess, the at least one hull panel is a first hull panel and a second hull panel, the first hull panel is disposed in the first hull recess and the second hull panel is disposed in the second hull recess.

In some implementations of the hull, a rear end of the at least one hull panel is joined with a portion of the hull body adjacent to a rear end of the at least one recess.

In some implementations of the hull, the biasing member is a spring and damper system.

In some implementations of the hull, the biasing member is an air spring.

In some implementations of the hull, the at least one hull panel is flexible.

In some implementations of the hull, the biasing member includes at least a resilient material.

In some implementations of the hull, the resilient material is disposed between and connected to the at least one recess surface and the at least one hull panel and a lateral surface of the resilient material generally follows an outer edge of the at least one hull panel.

In some implementations of the hull, the resilient material is a closed-cell foam.

According to another broad aspect of the present technology, there is provided a watercraft including a hull as described in any of the aspects or implementations above, a deck disposed on the hull, a propulsion system connected to at least one of the hull and the deck and a motor operatively connected to the propulsion system.

In some implementations of the watercraft, the hull defines a tunnel, the propulsion system is a jet propulsion system disposed at least in part in the tunnel, the motor is disposed between the hull and the deck, the deck defines a pedestal and the watercraft further comprises a straddle seat disposed on the pedestal.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as a hull for example, should be understood as they would be understood when these components or sub-assemblies are mounted to the vehicle, unless specified otherwise in this application. The term "straddle seat" refers to a seat on which a person normally sits astride. The term "motor" can refer to any component capable of driving the motion of a watercraft, which includes but is not limited to an internal combustion engine or an electric motor. Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8A is a left side elevation view of the hull of FIG. 3, with a hull panel in an unloaded position;

FIG. 8B is a left side elevation view of the hull of FIG. 3, with the hull panel in a loaded position;

FIG. 9A is a schematic drawing of the unloaded hull panel of FIG. 8A;

FIG. 9B is a schematic drawing of the loaded hull panel of FIG. 8B.

DETAILED DESCRIPTION

The present detailed description is intended to be only a description of illustrative examples of the present technology. The following description relates to ways of manufacturing and designing a hull for a watercraft, a personal watercraft and a sport boat watercraft. Other ways of manufacturing and designing a hull or watercraft are contemplated and this technology would encompass these other known ways and designs. Although described with respect to jet propelled watercraft, other propulsion systems are contemplated.

Figure 1:
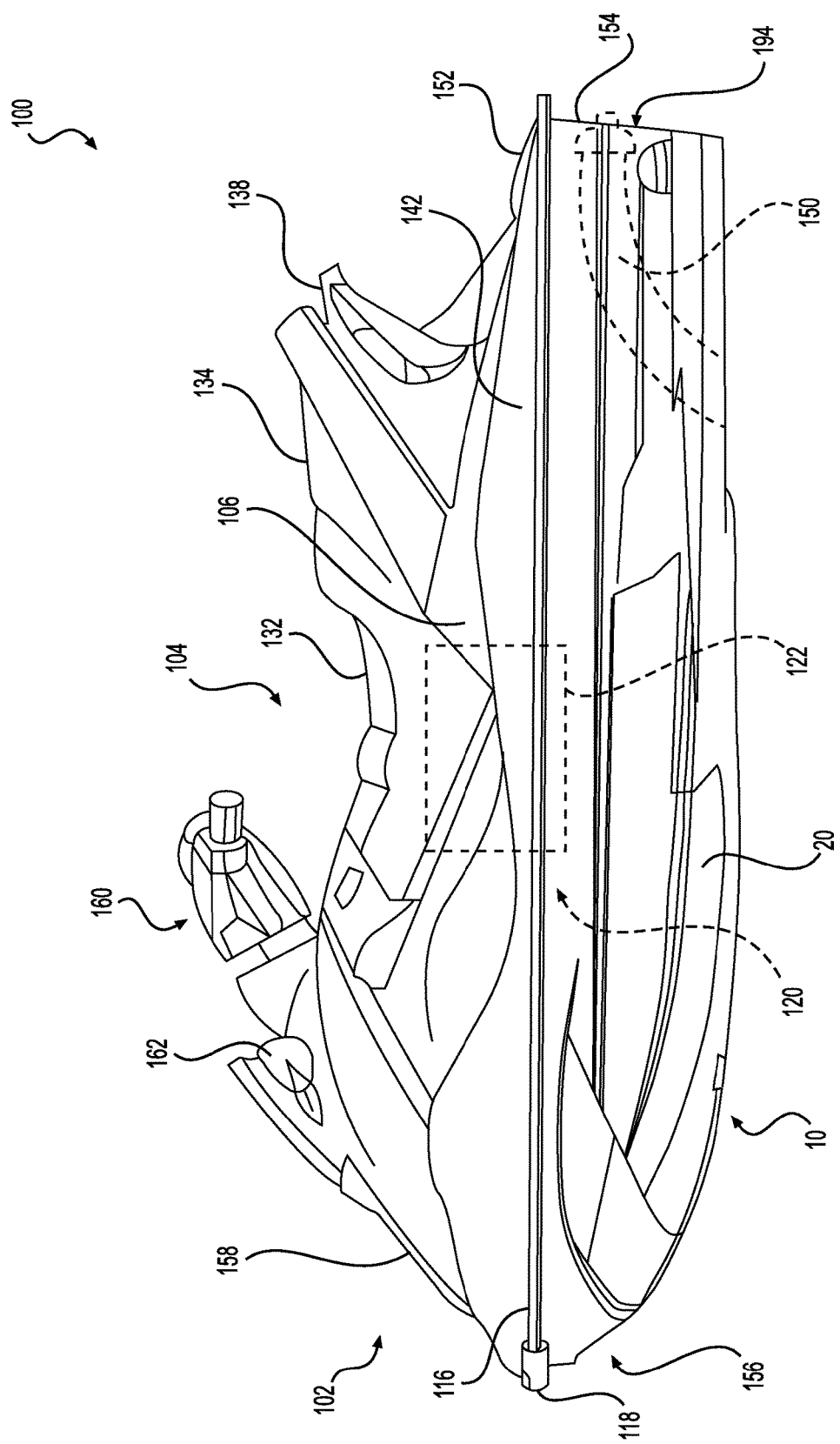
FIG. 1 illustrates a left side elevation view of a watercraft having a hull in accordance with an implementation of the present technology.

Referring to FIG. 1, an implementation of a personal watercraft 100 is shown. The personal watercraft 100 is built of the hull 10 and a deck 102. The hull 10 buoyantly supports the watercraft 100 in the water. The deck 102 is designed to accommodate an operator and multiple passengers. It is contemplated in other implementations to have a deck designed to accommodate only the operator. The hull 10 and deck 102 are joined together at a seam 116 that joins the parts in a sealing relationship. The seam 116 comprises a bond line formed by an adhesive. Other known joining methods could be used to sealingly engage the parts together, including but not limited to thermal fusion, molding or fasteners such as rivets, bolts or screws. A bumper 118 generally covers the seam 116, which helps to prevent damage to the outer surface of the watercraft 100 when the watercraft 100 is docked, for example. The bumper 118 can extend around the bow, as shown, or around any portion or all of the seam 116.

Figure 6:
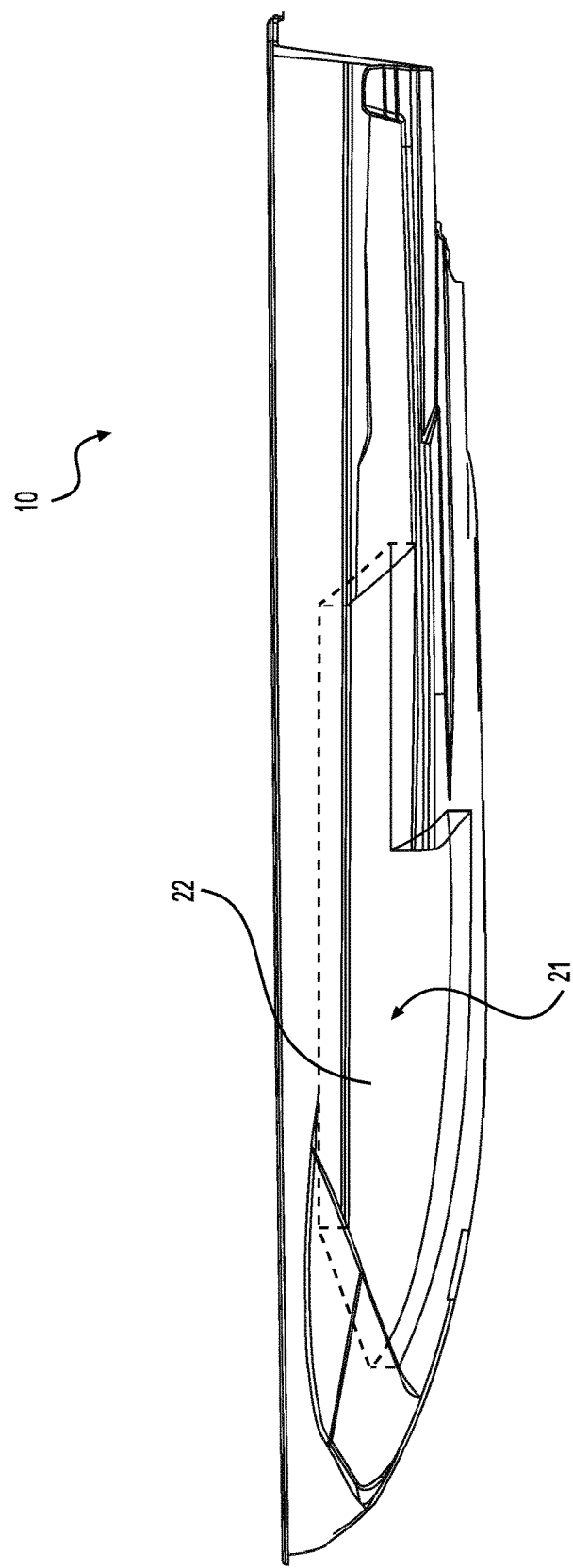
FIG. 6 is a left side elevation view of the hull of FIG. 3, with the hull panel removed to show a recess surface.

In accordance with the present technology, the hull 10 has two recess surfaces 22 which define two hull recesses 21 (shown in FIG. 6). In each hull recess 21, there is disposed a hull panel 20 for absorbing energy from chop and waves striking the hull 10 when operating the watercraft 100.

The space between the hull 10 and the deck 102 forms a volume commonly referred to as the engine compartment 120 (shown in phantom lines). The engine compartment 120 accommodates a motor 122, in the form of an internal combustion engine, as well as a muffler, gas tank, electrical system (battery, electronic control unit, etc.), air box, storage bins and other elements required or desirable in the watercraft 100. The motor 122 drives the water jet propulsion system 150 of the watercraft 100, though other types of propulsion systems are contemplated in other implementations. The jet propulsion system 150 is partially disposed in the tunnel 194 in the hull 10, best seen in FIG. 5.

As seen in FIG. 1, the deck 102 has a centrally positioned straddle-type seat 104 positioned on top of a pedestal 106 to accommodate multiple riders in a straddling position. The seat 104 includes a first, front seat portion 132 and a rear, raised seat portion 134. The seat 104 is made as a cushioned or padded unit, or as interfitting units. The first and second seat portions 132, 134 are removably attached to the pedestal 106 by a hook and tongue assembly (not shown) at the front of each seat portion 132, 134 and by a latch assembly (not shown) at the rear of each seat portion 132, 134, or by any other known attachment mechanism. The seat portions 132, 134 can be individually tilted or removed completely. The seat portion 132 covers an engine access opening defined by a top portion of the pedestal 106 to provide access to the motor 122.

As can also be seen in FIG. 1, a grab handle 138 is provided between the pedestal 106 and the rear of the seat 104 to provide a handle onto which a passenger may hold. This arrangement is particularly convenient for a passenger seated facing backwards for spotting a water skier, for example. Beneath the handle 138, a tow hook can be mounted on the pedestal 106. The tow hook can be used for towing a skier, wake boarder or floatation device, such as an inflatable water toy.

The watercraft 100 has a pair of generally upwardly extending walls located on either side of the watercraft 100 known as gunwales or gunnels 142. The gunnels 142 help to prevent the entry of water in the footrests of the watercraft 100, provide lateral support for the riders' feet, and also provide buoyancy when turning the watercraft 100, since personal watercraft can roll slightly when turning. Towards the rear of the watercraft 100, the gunnels 142 extend inwardly to act as heel rests. A passenger riding the watercraft 100 facing towards the rear, to spot a water-skier for example, may place his or her heels on the heel rests, thereby providing a more stable riding position. Heel rests could also be formed separately from the gunnels 142.

A reboarding platform 152 is provided at the rear of the watercraft 100 on the deck 102 to allow the rider or a passenger to easily reboard the watercraft 100 from the water. Carpeting or some other suitable covering may cover the reboarding platform 152. A retractable ladder or reboarding step (not shown) may be affixed to the transom 154 to facilitate boarding the watercraft 100 from the water onto the reboarding platform 152.

Referring to the bow 156 of the watercraft 100, the watercraft 100 is provided with a hood 158 located forwardly of the seat 104 and a helm assembly 160. A hinge (not shown) is attached between a forward portion of the hood 158 and the deck 102 to allow the hood 158 to move to an open position to provide access to the front storage bin. A latch (not shown) located at a rearward portion of the hood 158 locks the hood 158 into a closed position. When in the closed position, hood 158 prevents water from entering the front storage bin. Rearview mirrors 162 are positioned on either side of the hood 158 to allow the rider to see behind the watercraft 100. A hook (not shown) is located at the bow 156 of the watercraft 100. The hook is used to attach the watercraft 100 to a dock when the watercraft 100 is not in use or to attach to a winch when loading the watercraft 100 on a trailer, for instance.

Figure 2:
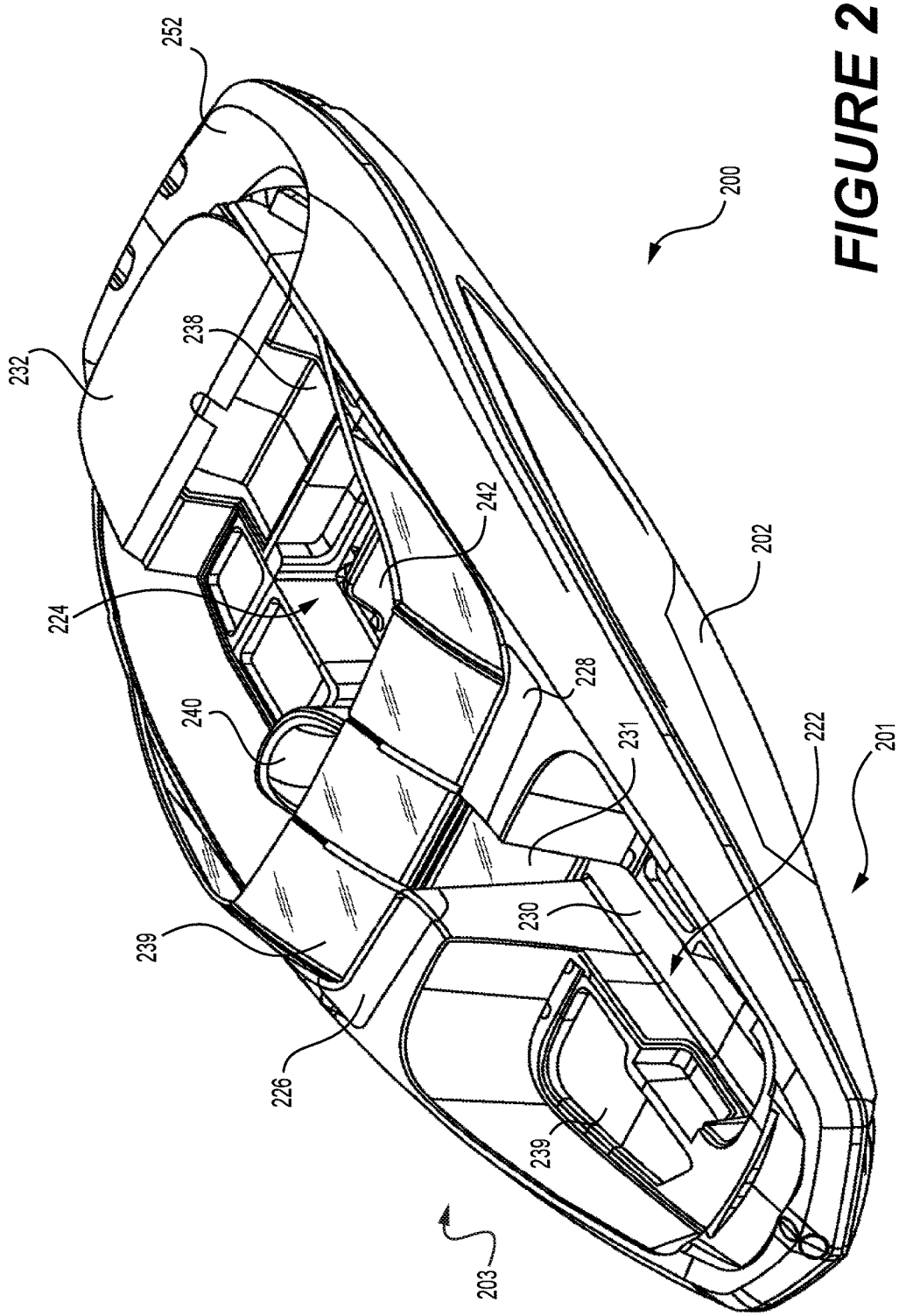
FIG. 2 illustrates a top perspective view, taken from a left, front side, of a watercraft having a hull in accordance with another implementation of the present technology.

FIG. 2 illustrates a sport boat 200 having a hull 201 including two hull panels 202, similar to those of hull 10. The following description relates to one way of manufacturing a sport boat. Other ways of manufacturing and designing sport boats are contemplated and the present technology would encompass these other known ways and designs.

For simplicity, the components of the sport boat 200 which are similar in nature to the components of the personal watercraft 100 described above will be given the same reference numeral. It should be understood that their specific construction may vary however.

The sport boat 200 has a hull 201 and a deck 203 supported by the hull 201. In accordance with the present technology, the hull 201 has two recess surfaces which define two hull recesses (not shown). In each hull recess, there is disposed a hull panel 202 for absorbing energy from chop and waves striking the hull 201 when operating the watercraft 200.

The deck 203 has a forward passenger area 222 and a rearward passenger area 224. A right console 226 and a left console 228 are disposed on either side of the deck 102 between the two passenger areas 222, 224. A passageway 230 disposed between the two consoles 226, 228 allows for communication between the two passenger areas 222, 224. A door 231 is used to selectively open and close the passageway 230. In some implementations, at least one engine (not shown) is located between the hull 201 and the deck 203 at the back of the boat 200 and powers the water jet propulsion system (not shown) of the boat 200. The engine cover 232 can also be used as a sundeck for a passenger of the boat 200 to sunbathe on while the boat 200 is not in operation. A reboarding platform 252 is located at the back of the deck 203 for passengers to easily reboard the boat 200 from the water.

The forward passenger area 222 has a C-shaped seating area 236 for passengers to sit on. The rearward passenger area 224 also has a C-shaped seating area 238 at the back thereof. A driver seat 240 facing the right console 226 and a passenger seat 242 facing the left console 224 are also disposed in the rearward passenger area 224. It is contemplated that the driver and passenger seats 240, 242 can swivel so that the passengers occupying these seats can socialize with passengers occupying the C-shaped seating area 238.

A windshield 239 is provided at least partially on the left and right consoles 224, 226 and forwardly of the rearward passenger area 224 to shield the passengers sitting in that area from the wind when the boat 200 is in movement. The right and left consoles 226, 228 extend inwardly from their respective side of the boat 200. At least a portion of each of the right and the left consoles 226, 228 is integrally formed with the deck 203. The right console 226 accommodates all of the elements necessary to the driver to operate the boat 200. These include, but are not limited to, a helm assembly in the form of the steering wheel, a throttle operator in the form of a throttle lever, and an instrument panel (not shown). The instrument panel has various dials indicating the watercraft speed, engine speed, fuel and oil level, and engine temperature. It is contemplated that the elements attached to the right console 226 could be different than those mentioned above. The left console 228 incorporates a storage compartment (not shown) which is accessible to the passenger sitting the passenger seat 242.

The hull 10 of the watercraft 100 according to a non-limiting implementation of the present technology is illustrated in FIGS. 3 to 7. As most easily seen in the bottom plan view of the hull 10 in FIG. 3, the hull 10 includes a hull body 30 and two hull panels 20. An alternative implementation having one hull panel will be described in more detail with respect to FIG. 16. It is also contemplated in alternative implementations to have more than two panels. The two hull panels 20 are positioned on either side of a keel 50 of the hull body 30. There is also a stopper 35 and a biasing member 25 for each hull panel 20. Both will be described in more detail below and are shown in dashed lines in FIG. 3.

Figure 3:
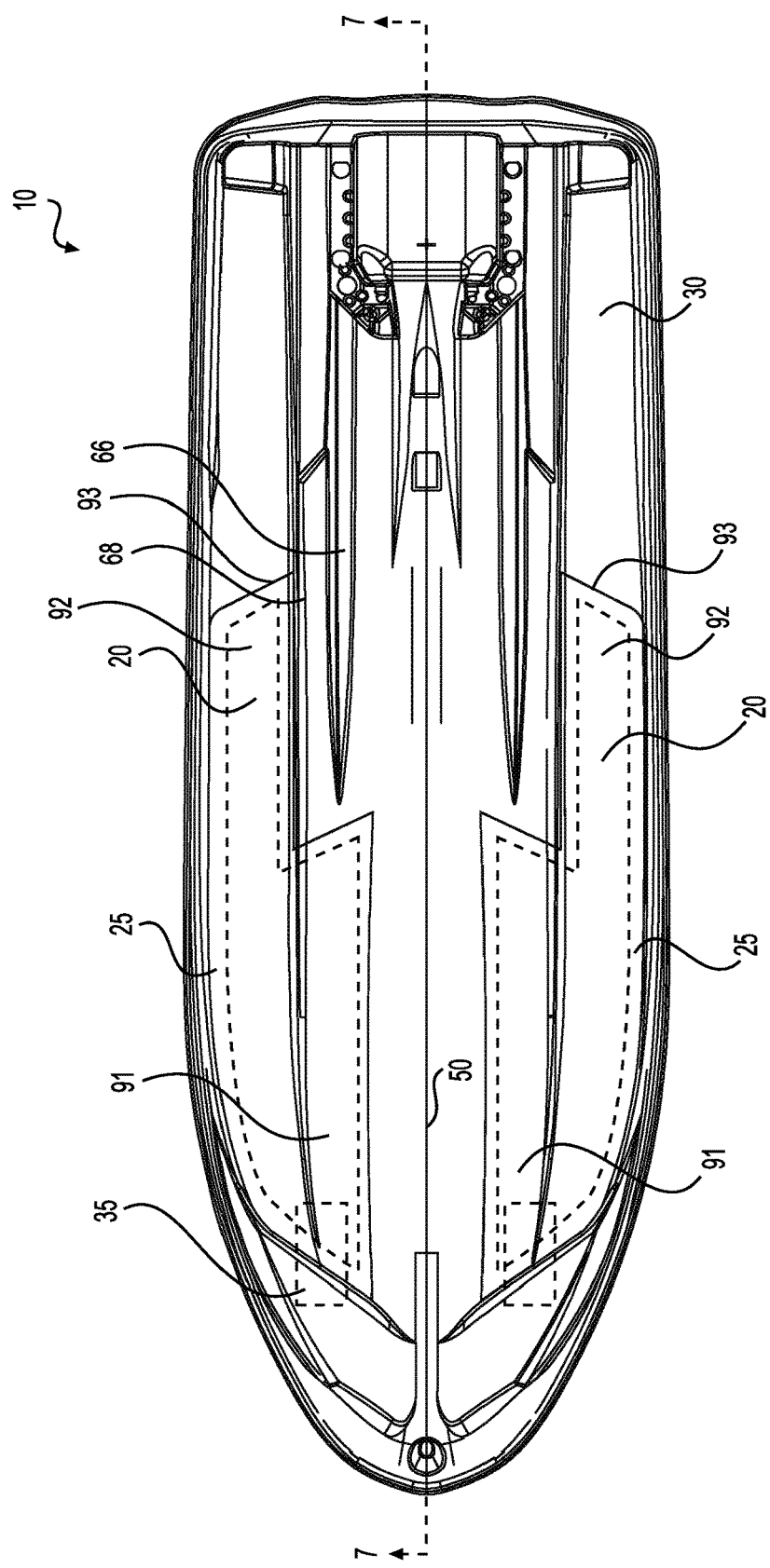
FIG. 3 illustrates a bottom plan view of a hull of the watercraft of FIG. 1.
Figure 4:
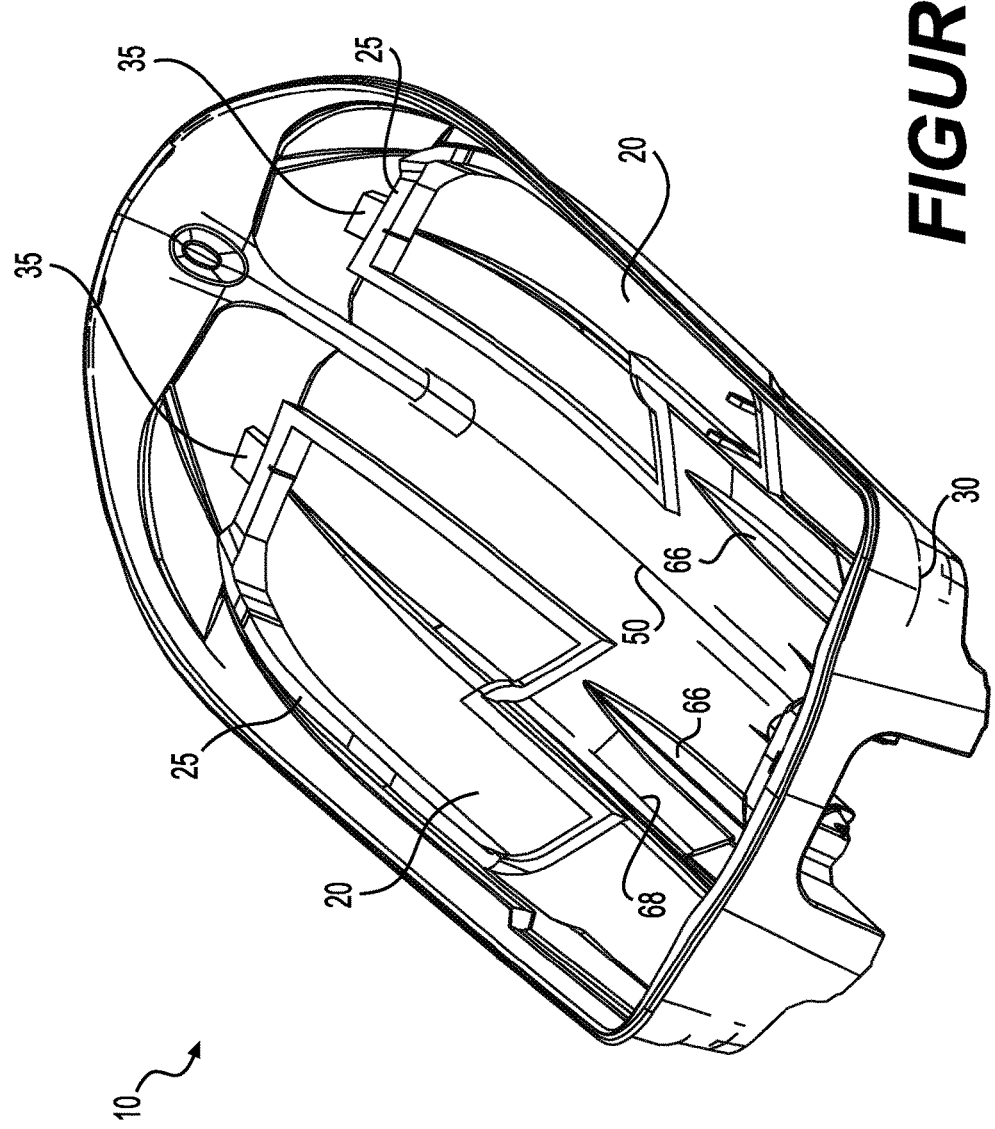
FIG. 4 is a top perspective view, taken from a rear, right side of the hull of FIG. 3 with the hull recess surfaces removed to show the hull panels.
Figure 5:
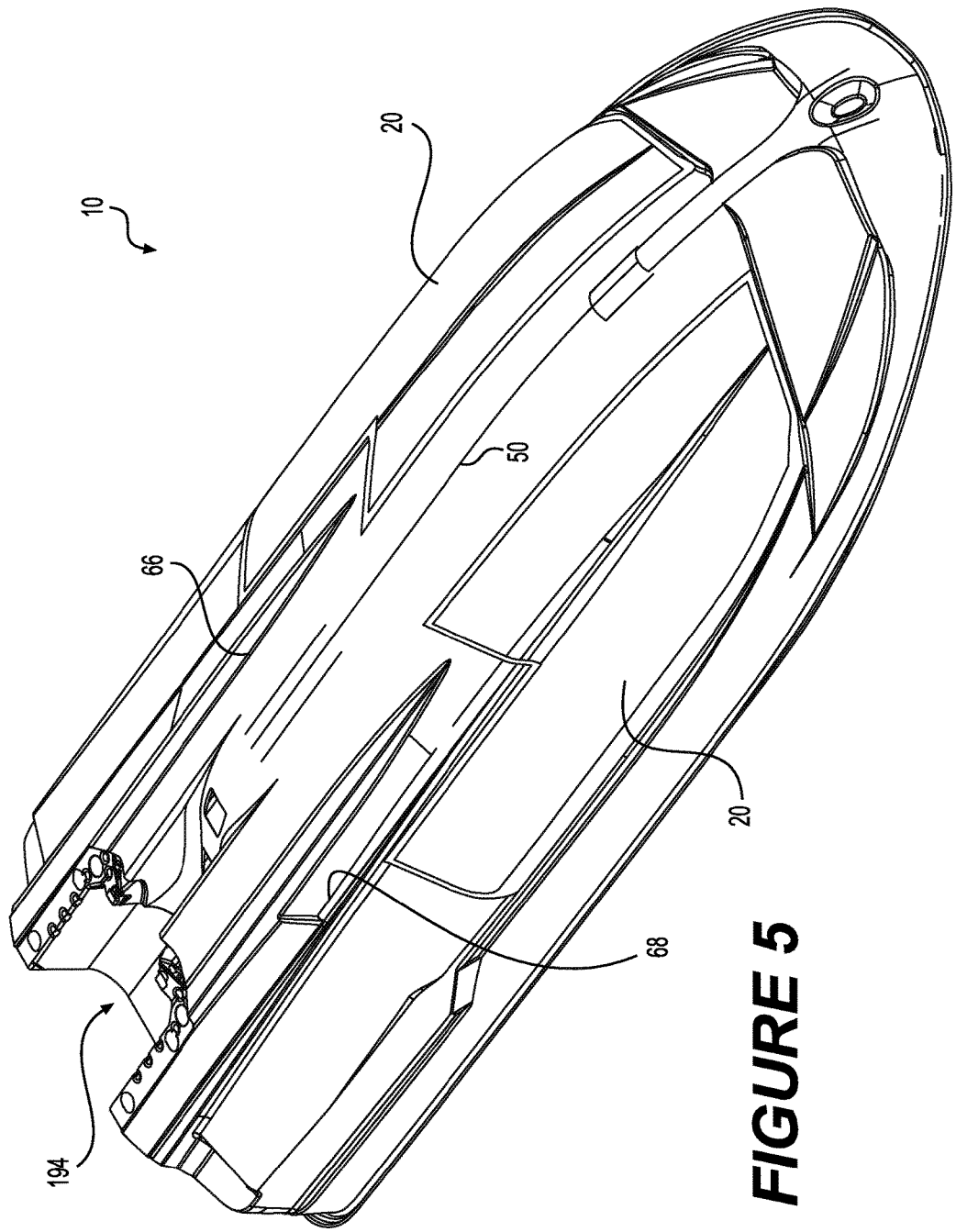
FIG. 5 is a bottom perspective view, taken from a front, left side of the hull of FIG. 3.

As best seen in FIGS. 3 to 5, the hull 10 is provided with a combination of strakes 66 and chines 68. A strake 66 is a protruding portion of the hull 10. A chine 68 is the vertex formed where two surfaces of the hull 10 meet. The combination of strakes 66 and chines 68 provide a watercraft using the hull 10 with its riding and handling characteristics.

In the present implementation, the hull body 30 also includes two recess surfaces 22, which in turn define two hull recesses 21, one of which can be seen in FIG. 6. The hull panels 20 are each disposed, at least partially, in a hull recess 21. Each hull recess 21 is an empty space that allows movement of its corresponding hull panel 20 into the hull 10 when the biasing member 25 is compressed. Such compression may be in response to landing shocks from chop and small waves. Each recess surface 22 defines the dimensions of the corresponding hull recess 21. Each recess surface 22 provides a surface to attach the biasing member 25 and may help impede water that may enter the hull 10 around the hull panel 20 from entering the watercraft.

It should be understood that in the context of the present technology, "disposed in the hull recess" is not intended to limit the placement of the hull panel 20 to the interior of the hull recess 21. It should not be understood to mean that the entirety of the panel is contained at all times within the recess, or that no portion of the hull panel 20 shall extend past the portion of the hull body 30 contouring the hull recess 21.

The shape, dimensions and positions of the hull panels 20 shown in FIG. 3 are particular examples of many shapes, forms and positions foreseen by the present technology. Some additional shapes can be seen in FIGS. 2, 16, and 18, though these are also non-limiting examples. The shape, position and scale of one ore more hull panels 20 could vary based on the hull 10 shape, the type and size of the watercraft using the hull 10, type or types of conditions in which the watercraft is designed to operate, the placement of footrests on the watercraft, aesthetic concerns, etc.

To cushion a watercraft against waves hitting the hull 10, the hull panel 20 moves into the hull recess 21, as shown in FIGS. 8A and 8B. The hull panel 20 has a range of motion within the hull recess 21 in the direction generally perpendicular to the recess surface 22, along a direction of compression toward the hull recess surface 22, although it is contemplated that the hull panel 20 could move in a direction other than generally perpendicular to the recess surface 22. It is further contemplated that the hull panel 20 or portions thereof could be flexible such that portions of the hull panel 20 could move with respect to one another during compression, as well as with respect to the recess surface 22. FIG. 8A shows the hull 10 where the hull panel 20 is in a first position, that first position describing the outward limit of travel of a front portion 91 of the hull panel 20. In this position, the hull panel 20 is in an unloaded state, where no external forces, or forces insufficient to overcome the biasing force of the biasing member 25, are being applied to the hull panel 20. In the some implementations, as shown in FIG. 8A, some portions of the hull panel 20 align substantially with contouring portions of the hull body. In this case, front portions and lateral side portions of the hull panel 20 align with adjacent portions of the hull body 30. It is contemplated that any or no portions of the hull panel 20 could align with the hull body 30, depending on the specific implementation.

FIG. 8B shows the hull 10 where the hull panel 20 is in a second position, the second position describing the inward limit of travel of the front portion 91 of the hull panel 20. This position can also be referred to as the loaded state, where the hull panel 20 is at its maximum limit of inward travel into the hull recess 21 when forces are applied to the hull panel 20.

A schematic illustrating the measurement for the range of motion for the first position and the second position is shown in FIGS. 9A and 9B. For the first position, a first distance D1 is measured along a line normal to the recess surface 22, from the recess surface 22 to an interior portion of the front portion 91 of the hull panel 20, as shown in FIG. 9A. Similarly, a second distance D2 for the second position is measured along a line normal to the recess surface 22, from the recess surface 22 to an interior portion of the front portion 91 of the hull panel 20, as shown in FIG. 9B. It should be noted that the first and second positions are the extremes of the range of motion of the front portion 91 and are not meant to limit the positions of the front portion 91 to only those positions. Depending on the force load applied to the hull panel 20, the front portion 91 may recede into the hull recess 21 by any distance between and including the first position distance and the second position distance.

It should also be noted that measuring the range of motion as a distance from a normal to the recess surface 22 is not meant to limit the direction of motion of the front portion 91 of the hull panel 20 to the direction of compression. When being hit by waves or in normal operation, the front portion 91 may move in any another direction, depending on factors including, but not limited to: the specific construction of the hull panel 20 or the biasing member 25, the forces applied and their directions.

In the implementation shown in FIGS. 3 to 7, the hull panel 20 is constructed and secured such that a rearward portion 92, which is rearward of the front portion 91, is capable of displacement along the compression direction. It is contemplated that the rear portion 92 may be any portion of the hull panel 20 that is found rearward of the front portion, be it forward or rearward of a middle of the hull panel 20. It is further contemplated that the rearward portion 92 may not necessarily include a rear end 93. In this case, the range of motion of the rearward portion 92 of the hull panel 20 is measured between a third position and a fourth position, in a manner similar to that of the front portion 91 of the hull panel 20. The third position refers to the location of the rearward portion 92 of the hull panel 20 in an unloaded state, while the fourth position refers to the location of the rearward portion 92 of the hull panel 20 in its maximum loaded state. Again, the distance between the third position and the fourth position is the maximum range of motion. The rearward portion 92 is not limited to these positions. Furthermore the hull panel 20 motion is again not confined to the compression direction, as discussed above.

For the rearward portion 92, the third position is described by a third distance D3 as shown in FIG. 9A. The third distance D3 is measured along a line normal to the recess surface 22, from the recess surface 22 to an interior portion of the rearward portion 92 of the hull panel 20. Similarly, the fourth distance D4 is measured along a line normal to the recess surface 22, from the recess surface 22 to an interior portion of the rearward portion 92 of the hull panel 20, also shown in FIG. 9B. For some implementations, the range of motion is greater in the front portion 91 of the hull panel 20 than for the rearward portion 92 of the hull panel 20, where the difference between the first distance D1 and the second distance D2 is greater than the difference between the third distance D3 and the fourth distance D4. In some implementations, the range of motion of the rearward portion 92 of the hull panel 20 is limited in part by translationally fixing a rear end 93. Relatedly, it is also contemplated that in some implementations, there is no motion along the compression direction for the rear end 93 of the hull panel 20. This will be discussed in more detail below with respect to FIGS. 16, 17A and 17B.

In other implementations, the front and rearward portions 91 and 92 may move in opposite directions in response a wave or the like striking the hull panel 20. For example, it is contemplated that a hinge structure could be provided at or near the rearward portion 92 and a compressible biasing member at or around the front portion 91, which would result in the rear end 93 travelling away from the recess surface 22 when the hull panel 20 is in its loaded state.

For some implementations, in the first position (the unloaded state), all or part of an edge of the hull panel 20 is aligned, or flush, with the portions of the hull body 30 that contour the hull panel 20. Not all of the panel may be aligned. The hull panel 20 is a three dimensional object, and depending on the surface form, portions of the hull panel 20 may extend past the contouring portions of the hull body 30 or portions of the hull panel 20 may contain recesses that are inward of the contouring portions of the hull body 30. For some implementations, at least the front portion 91 of the hull panel 20 is flush with the adjacent portion of the hull body 30. For some implementations, the first position and the third position are aligned with the adjacent portions of the hull body 30. For some implementations, one or more edges of the hull panel 20 are adjacent or incorporate desirable discontinuities in the hull, such as strakes, chines or steps.

In some implementations the front portion 91 of the hull panel 20 has a greater range of motion than the rearward portion 92 of the hull panel 20. There are a number of different ways in which this may be accomplished. In FIGS. 3 to 7, the biasing member 25 is a resilient material, where the material is thicker near the front portion 91 than the rearward portion 92, allowing greater depression of the hull panel 20 under landing shocks in the front portion 91. In some implementations a portion of the hull panel 20 other than the front portion 91 and the rearward portion 92 is provided with greater range of motion than adjacent portions. For example, it is contemplated that one of the lateral edges of the hull panel 20 have a greater range of motion than the other.

In addition to motion of the hull panel 20 under landing shocks, in some implementations the hull panel 20 itself is flexible. The material of the hull panel 20 allows some deformation to absorb a portion of the energy of the landing shocks of chop and small waves.

Figure 7:
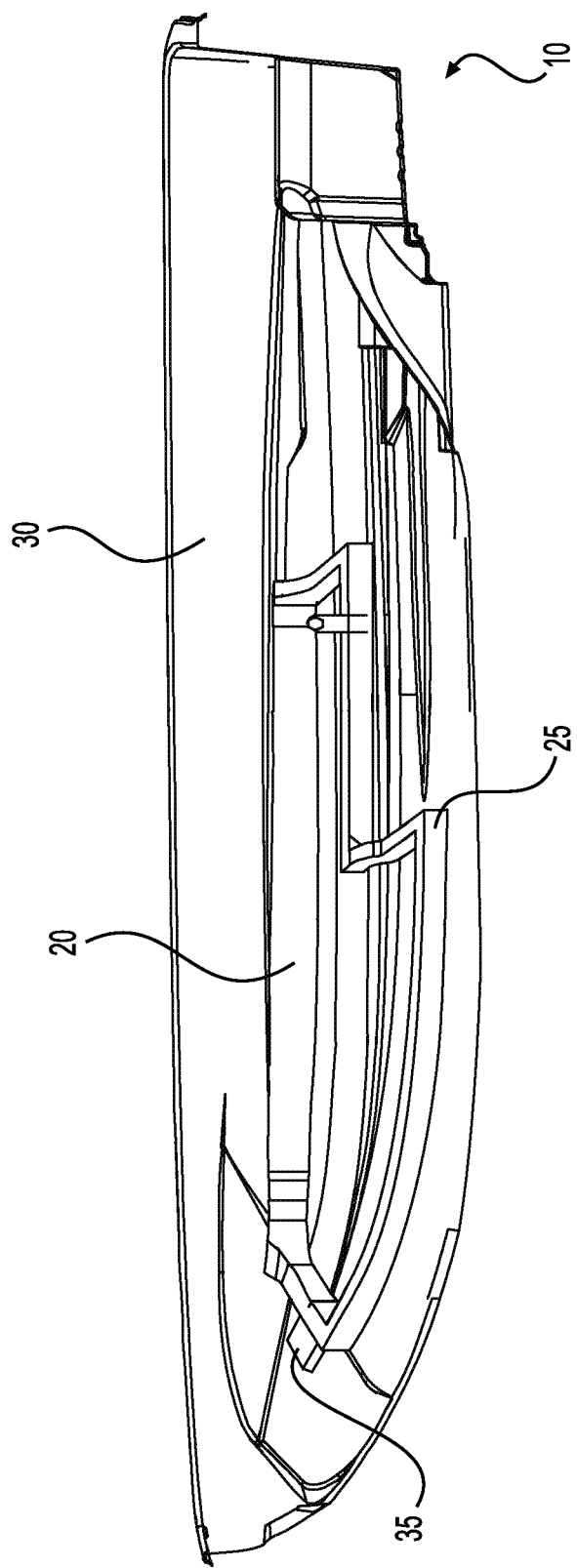
FIG. 7 is a cross-sectional view of the hull taken along line 7-7 of FIG. 3.

In the implementation displayed in FIGS. 3 to 7, the biasing member 25 is composed in part of a resilient material. As best seen in FIG. 7, the biasing member 25 of resilient material is contouring an edge portion of the hull panel 20, as well as the hull recess 21 (the hull recess has been removed from FIG. 7 for ease of viewing). If this resilient material is water repelling in some manner, for example using closed-cell foam, rubber or a synthetic rubber such as neoprene, the biasing member 25 can also act as a water seal to prevent water from entering the area between the hull panel 20 and the recess surface 22, which could otherwise provoke adverse effects on the handling of the watercraft using the hull 10.

The incorporation of a biasing member 25 that is impervious to water, contouring the hull panel 20 is not the only manner foreseen in which water may be prevented from entering the hull recess 21. For example, an open-cell foam treated with a sealant on its outer surface may be used in a similar manner to the closed-cell foam of the biasing member 25. Other possible solutions may include bellows surrounding other types of biasing members, such as springs, or a rubber curtain secured to both the hull panel 20 and the contour of the hull recess 21.

The hull 10 also has a stopper 35 to limit travel of the hull panel 20 outward from the hull 10. The stopper 35 is attached to the hull panel 20, in the form of an abutment that engages an interior portion of the hull body 30, as seen in the implementation illustrated in FIG. 4. It is contemplated that in other implementations, the stopper 35 can be connected to the hull body 30, the recess surface 22, or both. In various implementations of the present technology, possible types of stopper 35 include, but are not limited to: a rigid abutment attached to the panel, a flange attached to the hull panel 20 or the hull body 30, a piston with limited travel, a spring with limited travel, one or more cables under tension, fasteners allowing translation perpendicular to the hull, etc. It is contemplated that the stopper 35 could also limit the range of motion of the hull panel 20 in a direction toward to the recess surface 22. More particularly, it is contemplated that the stopper 35 could engage a second abutment (not shown) formed in the hull body 30 opposite the first abutment.

Figure 10:
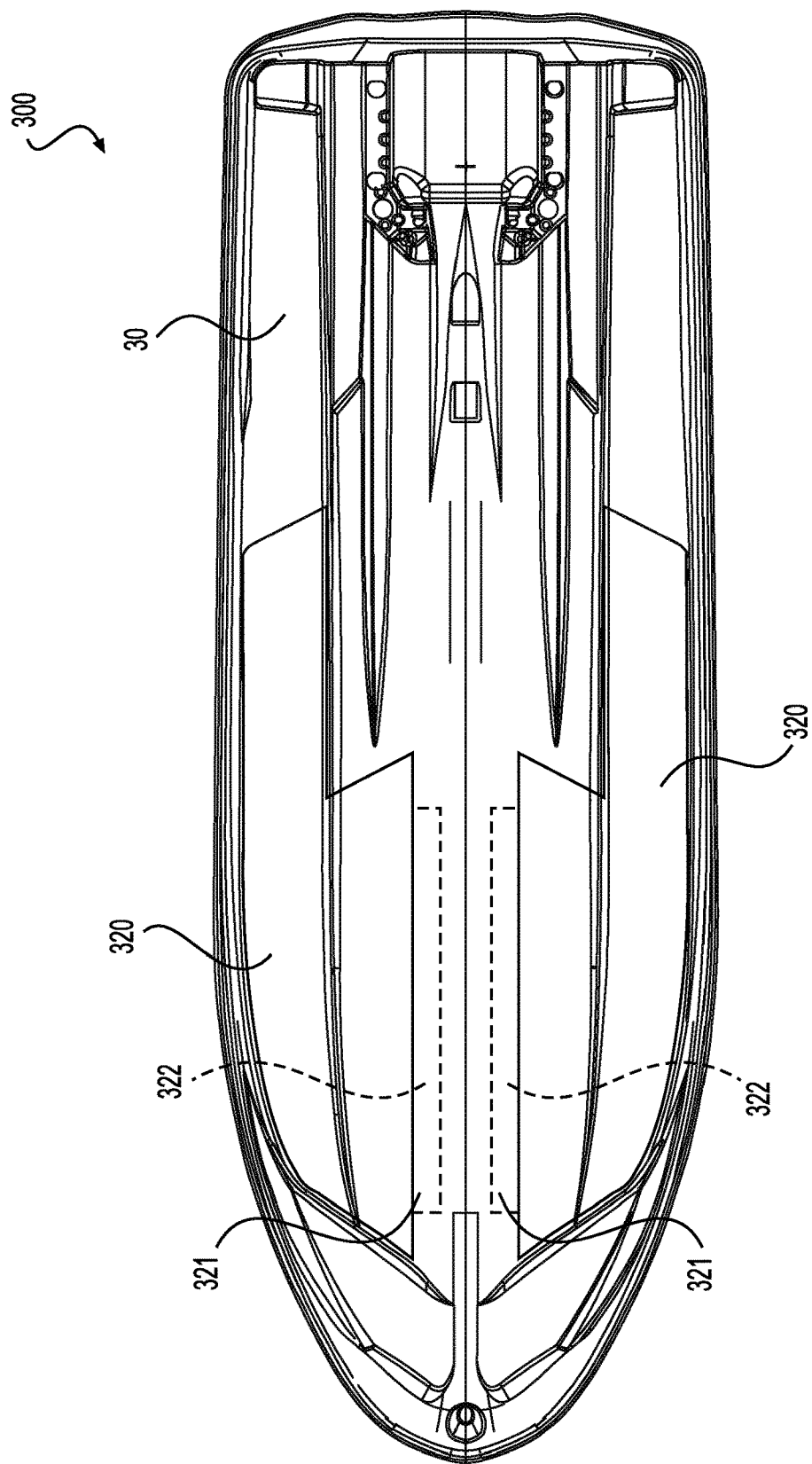
FIG. 10 illustrates a bottom plan view of a hull for a watercraft in accordance with another implementation of the present technology, where the hull body overlaps the hull panels.
Figure 11:
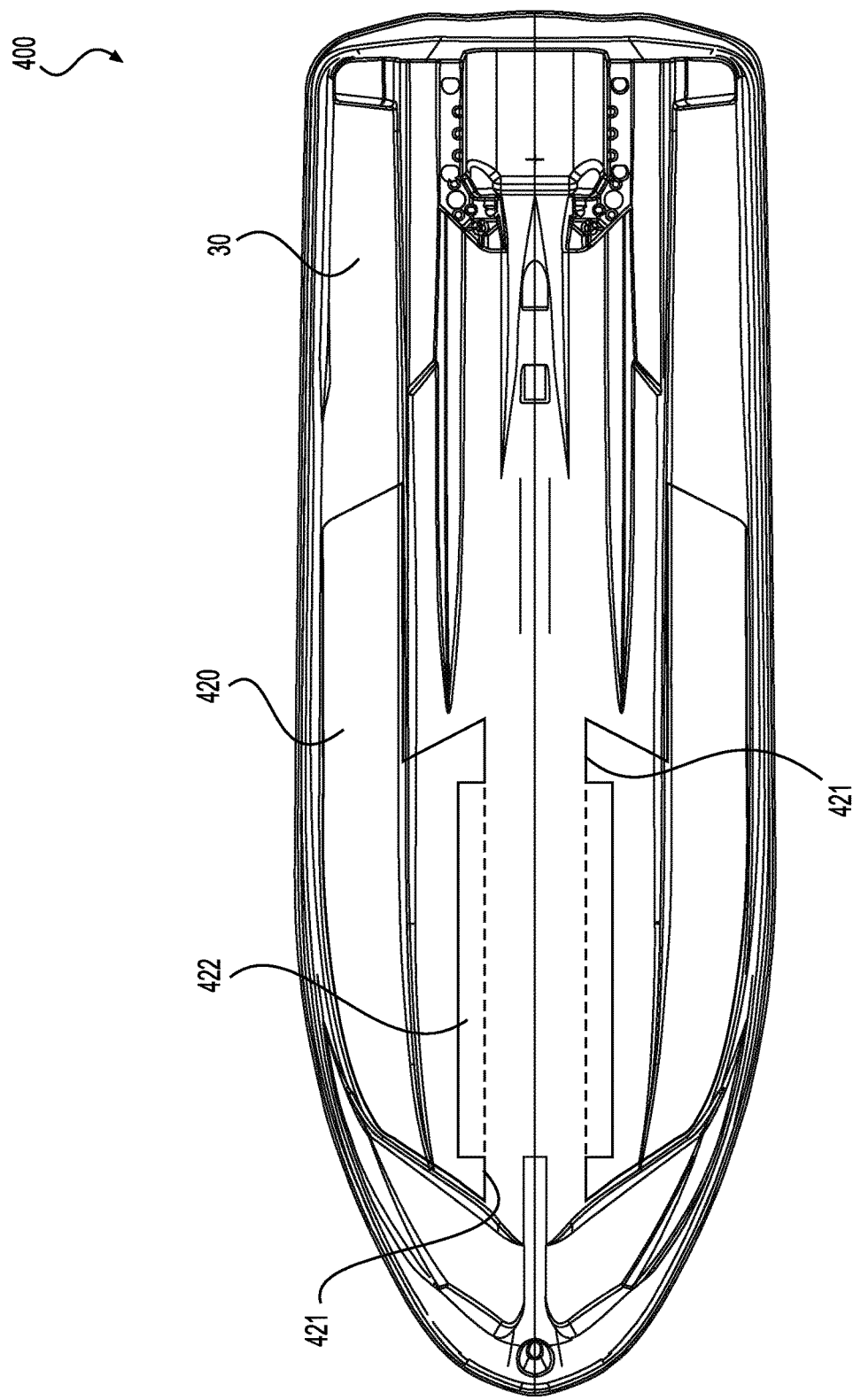
FIG. 11 illustrates a bottom plan view of a hull for a watercraft in accordance with another implementation of the present technology, where the hull panels overlap the hull body.

It is also contemplated that the stopper 35 could be a structure integral with the hull panel 20 or the hull body 30 that prevents the movement past the first position away from the recess 21. In the implementation shown in FIG. 10, portions 322 of the hull panel 320 overlap adjacent portions 321 of an interior portion of the hull body 30. In the implementation shown in FIG. 11, portions 422 of the hull body 30 adjacent to the hull recess 21 overlap the hull panel 420 where an edge 421 of the hull panel 420 is stopped by the overlapping portions 422 of the hull body.

It is envisioned that other mechanisms that limit the range of motion in the direction outward from the hull may be employed. For example, the function of the stopper 35 can be integrated with the biasing member 25, where the biasing member 25 has an appropriately limited range of travel. Additionally, some types of stoppers could be envisioned to aid in guiding the movement of the hull panel 20 in operation. In some implementations, it is contemplated that the stopper 35 may be removed completely, or its function performed by another element of the hull 10. It is further contemplated that more than one stopper 35 could be employed. In some implementations, a plurality of stoppers at different locations on the hull panel 20 could be employed, as will be discussed with respect to FIG. 16.

Figure 12:
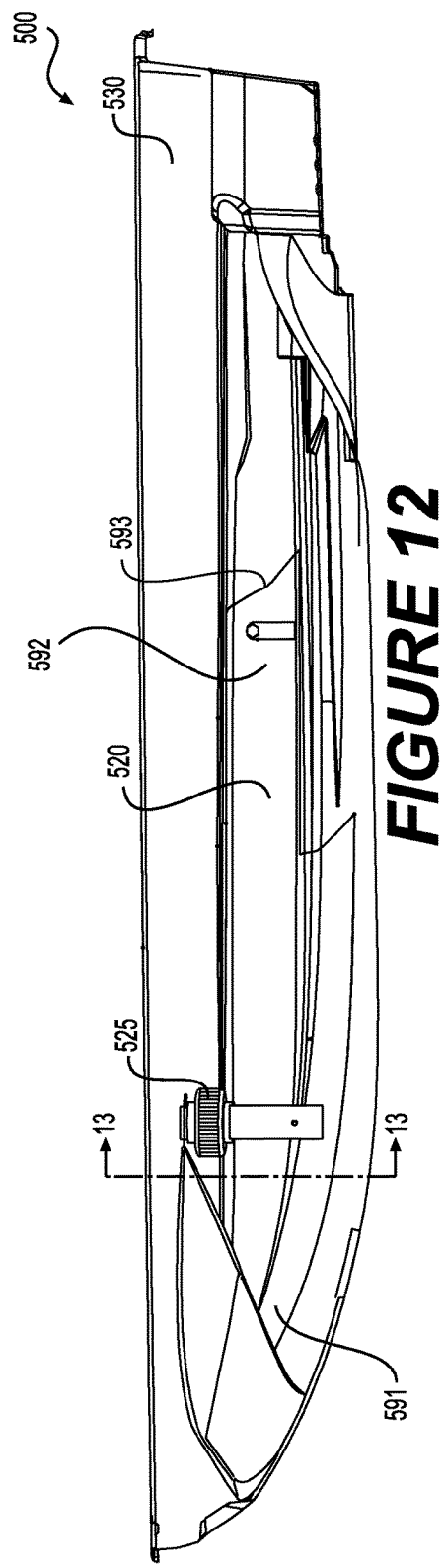
FIG. 12 is a cross-sectional view of a hull in accordance with another implementation of the present technology.
Figure 13:
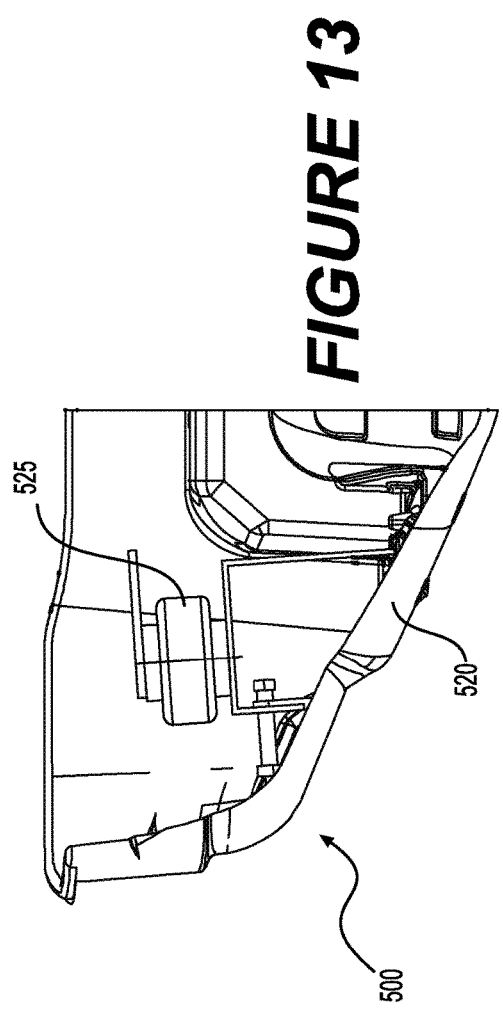
FIG. 13 is a cross-sectional view taken along line 13-13 of FIG. 12.

Referring to FIGS. 12 and 13 concurrently, two cross-sectional views of a hull 500 in accordance with another implementation of the present technology are shown. In this implementation, an air spring is used as the biasing member 525 for each hull panel 520. The air spring biasing member 525 is attached to the hull panel 520 and the recess surface (not shown) in order to bias the front portion 591 of the hull panel 520 outward toward its first position, at a position flush with the hull body 530, by applying a force outward from the hull recess 21. Upon being hit with chop and small waves, the air spring biasing member 525 will compress and allow the hull panel 520 to recede into the hull recess 21, as with the hull 10 implementation of FIG. 1. It is contemplated that the pressure in the air spring biasing member 525 could be adjusted to vary its response to loading.

Figure 14:
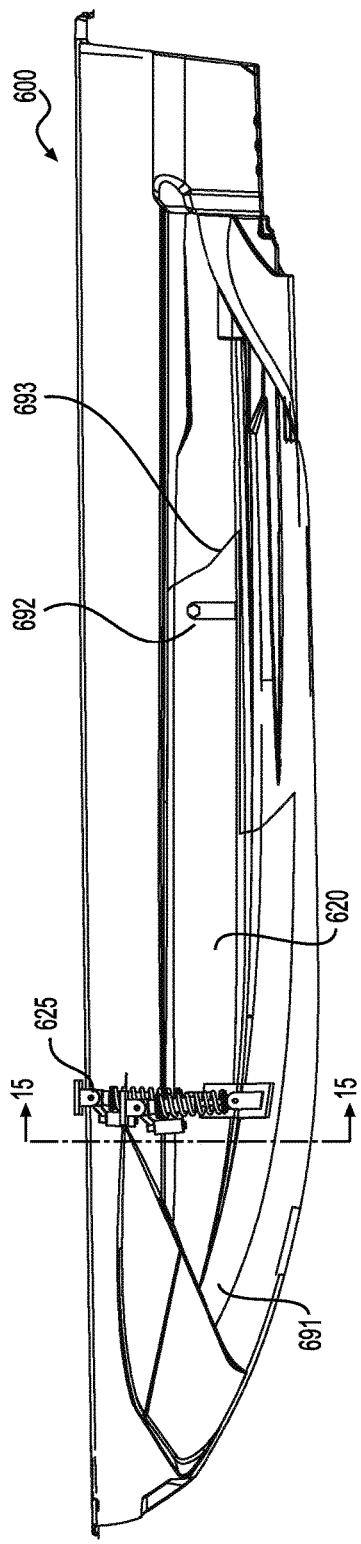
FIG. 14 is a cross-sectional view of a hull in accordance with another implementation of the present technology.
Figure 15:
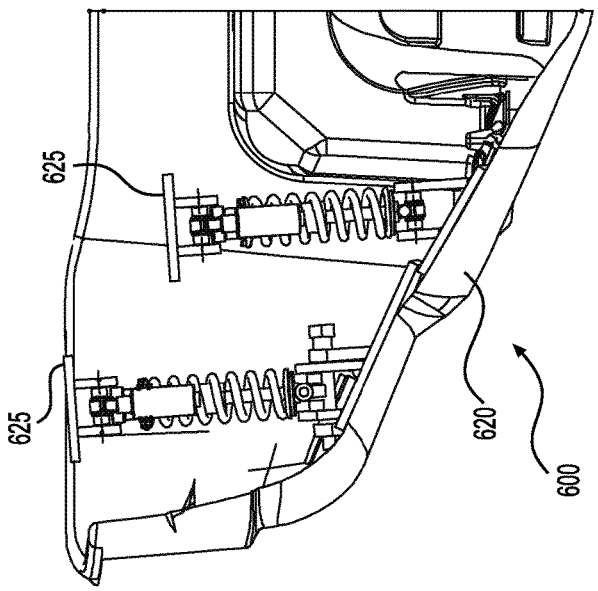
FIG. 15 is a cross-sectional view taken along line 15-15 of FIG. 14.

FIGS. 14 and 15 present two cross-sectional views of a hull 600 for a watercraft in accordance with another implementation of the present technology. In this implementation, a spring and damper style system is used as the biasing member 625, specifically a coil over shock system. Specifically, there are two spring and damper biasing members 625 used for the hull panel 620. Similarly to the hull 500 of FIG. 12, the spring and damper system biasing members 625 are mounted on a front portion 691 of the hull panel 620 to bias the position of the front portion 691 of the hull panel 620 toward its first position. The opposite end of the biasing members 625 are secured to the recess surface (not shown for clarity). In some implementations, it is contemplated that a pivoting mechanism could be attached to a rearward portion 692 of the hull panel 620 to add stability to the hull panel 620. It will be appreciated that a stopper mechanism could also be incorporated with the biasing members 625 to limit the inward and outward travel of the hull panel 620 with respect to the recess surface.

In addition to the non-limiting examples of types of biasing members presented above, it is envisioned that biasing members of other mechanisms may be used in other implementations. For example, a combination of elements may be used to compose a biasing member, such as resilient material surrounding a spring system. In other implementations, biasing members may be composed at least in part by an active control system, allowing control of the properties of the biasing member. For example, an air spring with an active control could allow an operator of the hull 10 to vary and control the pressure of the biasing force applied.

Figure 16:
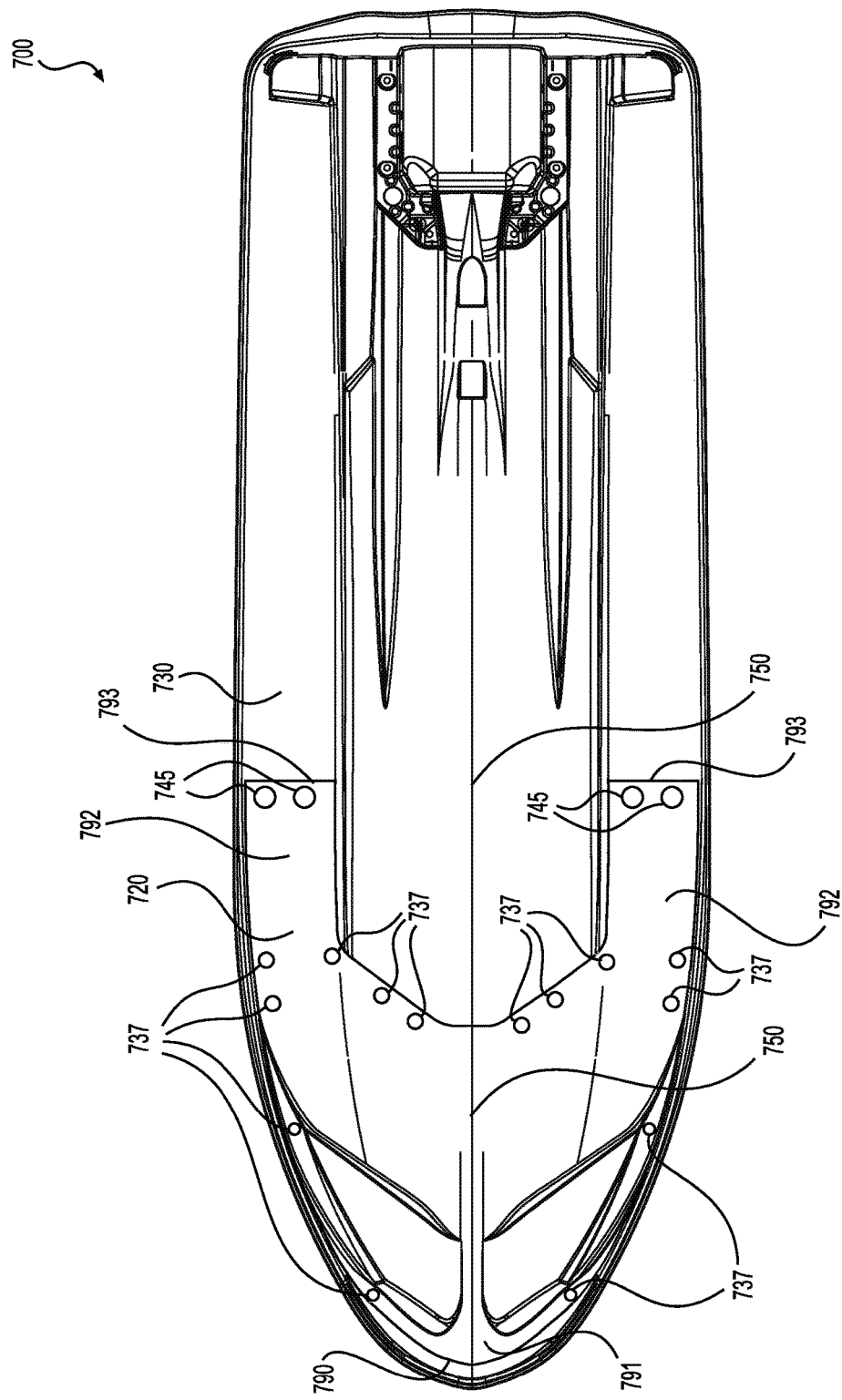
FIG. 16 illustrates a bottom plan view of a hull for a watercraft in accordance with another implementation of the present technology, having a hull panel including a keel section.
Figure 17A:
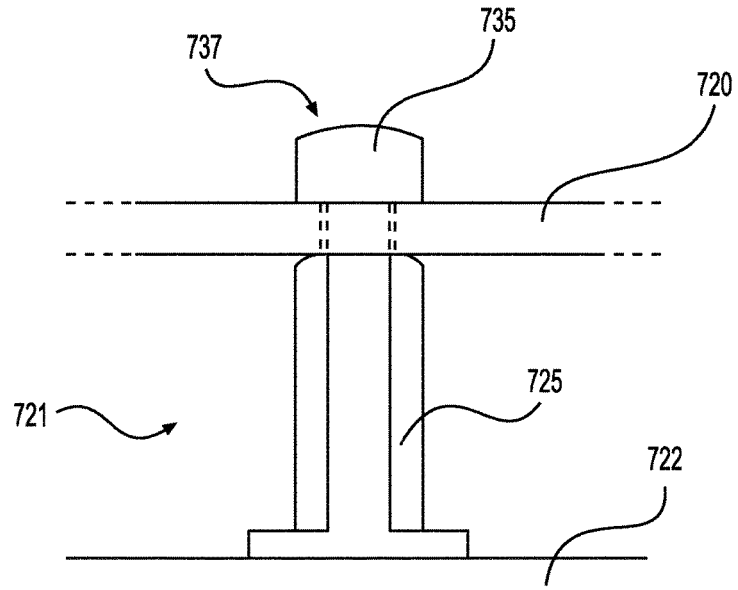
FIG. 17A is a side elevation view of a panel mount used in FIG. 16, with the hull panel in an unloaded position.

FIG. 16 illustrates another implementation of the present technology, where a hull 700 has a single hull panel 720 which includes a portion of the keel 750. The hull panel 720 has a front edge 790 spanning the center of the hull 700. In this implementation the hull panel 720 can absorb energy from chop and waves incident spanning the center of the hull 700 of a watercraft. Part of the keel 750 is contained in the hull panel 720 and rearward of the hull panel 720 the keel 750 continues on the hull body 730.

Figure 17B:
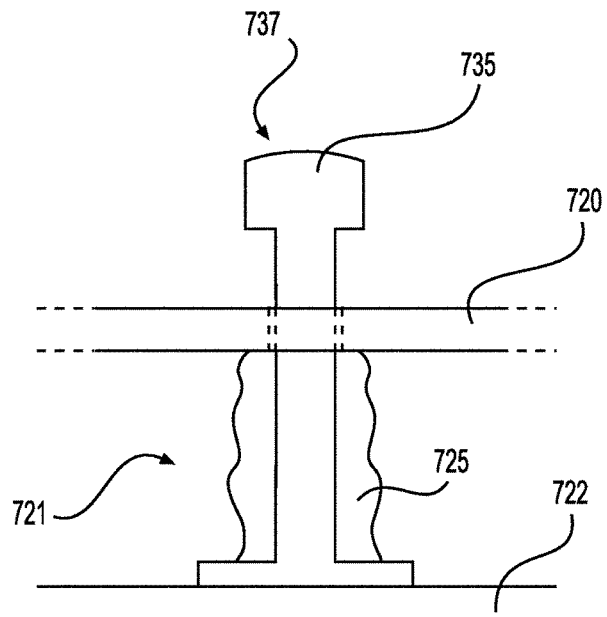
FIG. 17B is a side elevation view of a panel mount used in FIG. 16, with the hull panel in a loaded position.

As illustrated in FIG. 16, multiple panel mounts 737 are employed in this implementation. The panel mount 737 is shown in a non-limiting embodiment of in FIGS. 17A and 17B. Each panel mount 737 is mounted to the recess surface 722 and passes through the hull panel 720. The panel mount 737 includes a stopper 735 to limit the outward extension of the hull panel 720. This can be seen in FIG. 17A, where the hull panel 720 is in the unloaded position and the stopper 735 limits the outward extension of the hull panel 720 from the hull recess 721. The panel mount 737 also includes a biasing member 725. The biasing member 725 in this implementation is specifically a resilient mount shock absorber 725. The resilient mount shock absorber 725 also acts absorb landing shocks to the hull panel 720. The resilient mounts also act to limit the travel of the hull panel 720 into the hull recess 721, as is illustrated in FIG. 17B when the hull panel 720 is in the loaded position. It is contemplated that as few as one panel mount 737 may be used. It is also contemplated that two or more panel mounts 737 could be employed to act as combined stoppers 735 and biasing members 725. It is further contemplated that the panel mounts 737 may be used in combination with other biasing member mechanisms or other stopper mechanisms. It is contemplated that hull panel 720 be provided with a depression sized and shaped to receive each stopper 735 such that, when hull panel 720 is in the unloaded position, each stopper 735 is located within a respective depression and the outer surface of each stopper 735 is flush with the outer surface of the hull panel 720.

The hull panel 720 has two rear ends 793. The rear ends 793 are each joined to the hull body 730 by two bolts 745. It is contemplated that in some implementations, more or less bolts 745 could be used to join the hull panel 720 to the hull body 730. It is also contemplated that the hull panel 720 could be joined with the hull body 730 in a number of different ways. These include, but are not limited to: different kinds of fasteners, adhesives, hinges at the rear ends 793, welding a portion of the hull panel 720 to the hull body 730 and having the hull panel 720 integral with the hull body 730 (integrally joined). An implementation with the hull panel 720 integral with the hull body 730 will be discussed below with respect to FIG. 18.

It is contemplated that while the hull panel 720 may be translationally fixed and has no range of motion in the compression direction at the rear end 793, the rear end 793 may still pivot or rotate when the hull panel 720 receives landing shocks from chop and small waves.

Additionally, it is contemplated that rearward portions 792 of the hull panel 720 may still have a range of motion in the compression direction even when the rear ends 793 are translationally fixed. The magnitude of the range of motion in the compression direction of the hull panel 720, including the rearward portions 792 may depend on various factors, including but not limited to, the flexibility of the hull panel 720 and the mechanism joining the hull panel 720 to the hull body 730. It is contemplated that the shape and thickness of the hull panel 720 be varied so as to make it more flexible in some regions and less flexible in others. In one non-limiting embodiment, the travel of the hull panel 720 increases progressively from rear to front. It is also contemplated that the joined rear end 793 could form a living hinge that is also capable of a hinging movement, leaving the front portion 791 a greater range of movement than the rearward portion 792.

Figure 18:
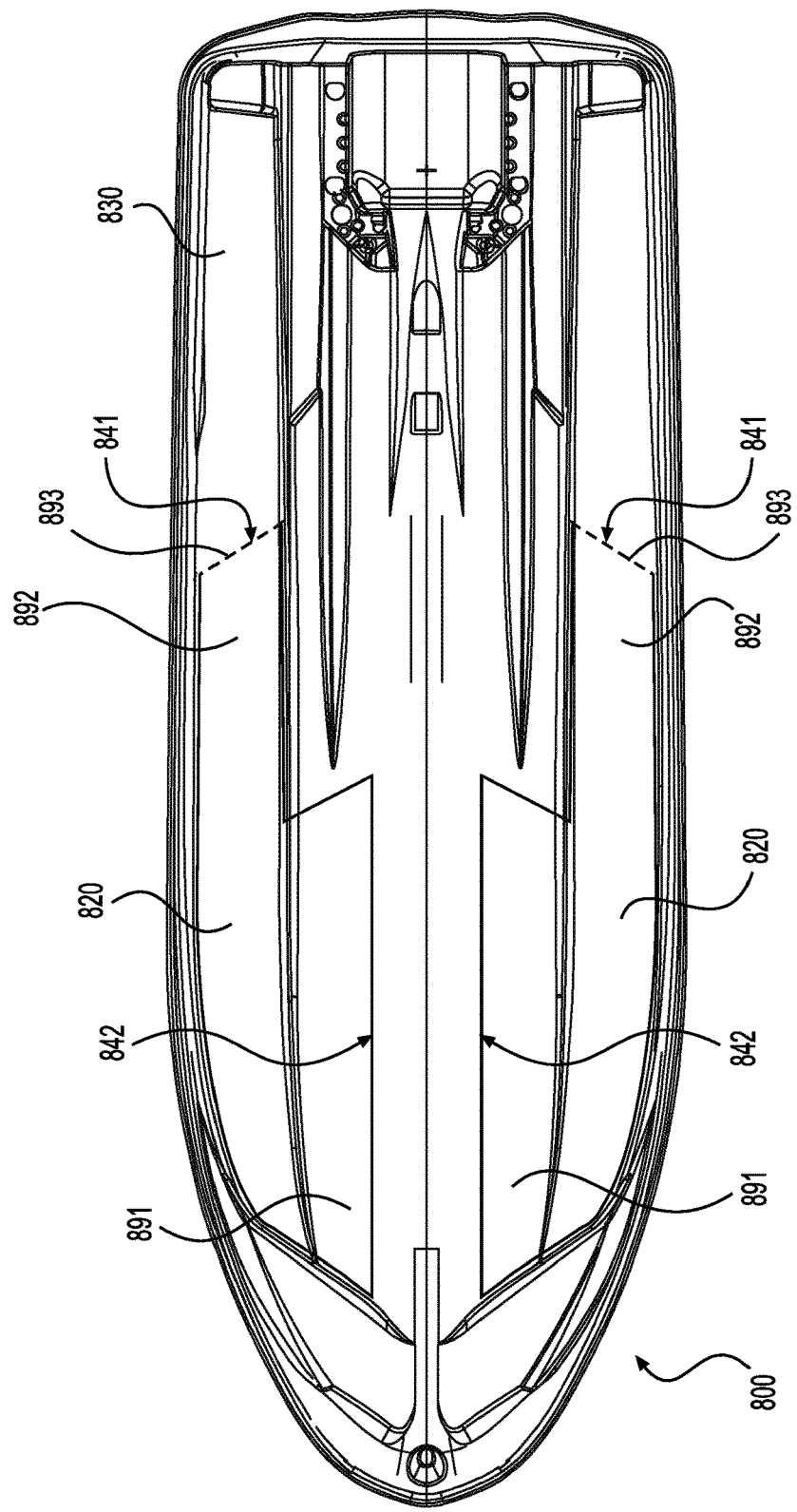
FIG. 18 illustrates a bottom plan view of a hull for a watercraft in accordance with another implementation of the present technology, having panels which are integrally joined with the hull body.
Figure 19:
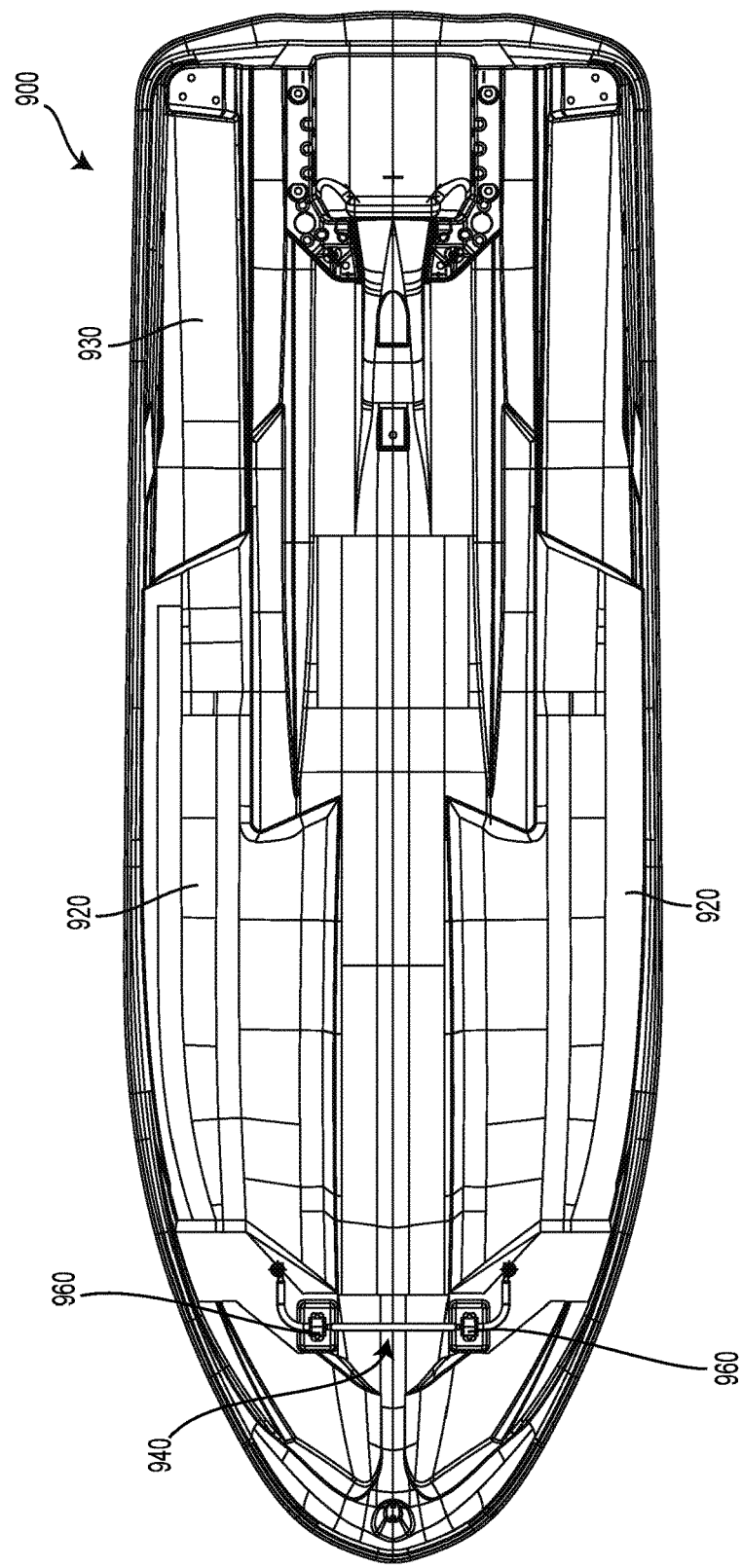
FIG. 19 illustrates a top plan view of a hull for a watercraft in accordance with another implementation of the present technology, the hull including a stabilizing bar connecting two hull panels.
Figure 20:
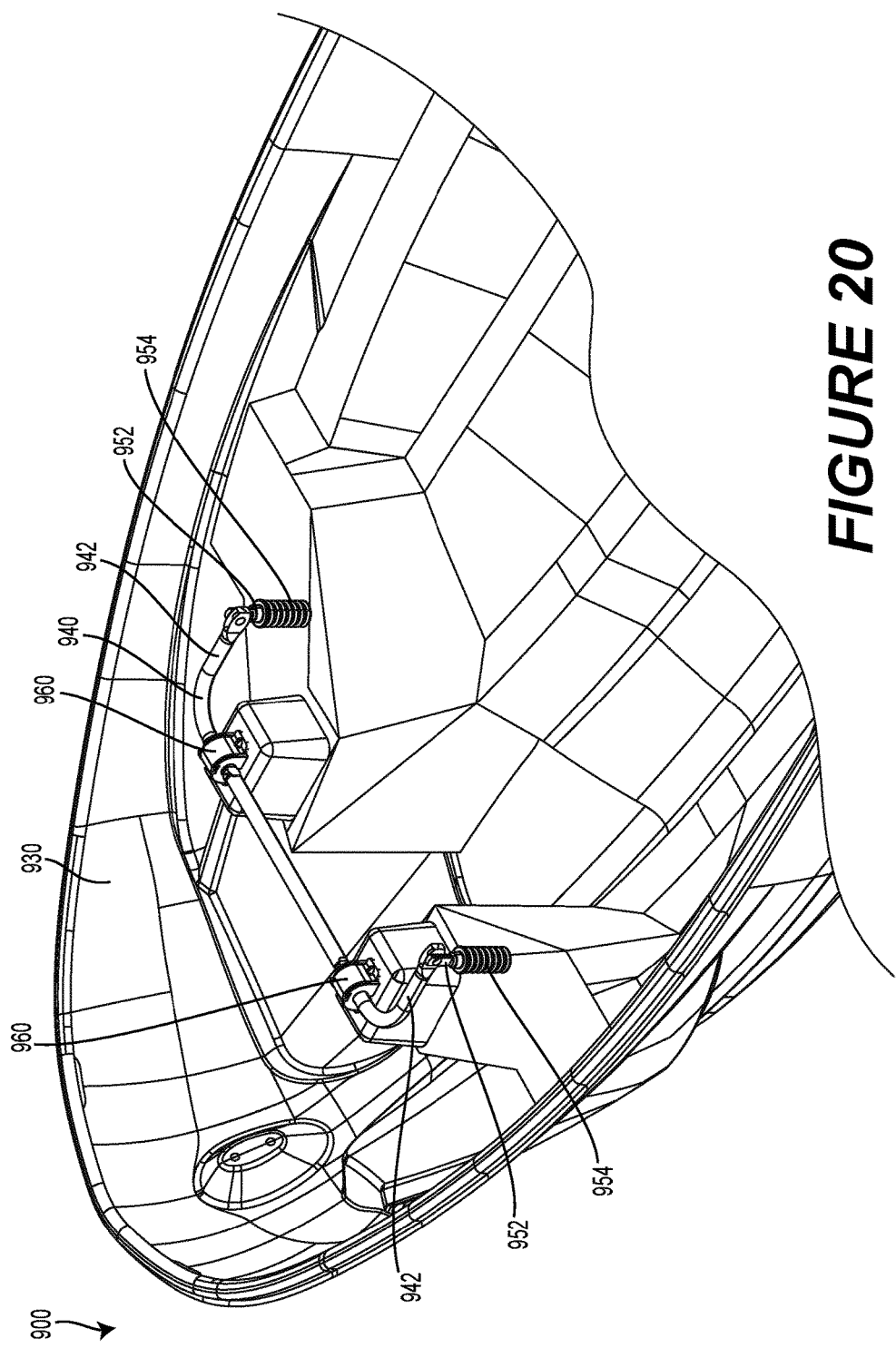
FIG. 20 is a top, rear, and left side perspective view of the hull of FIG. 19.
Figure 21:
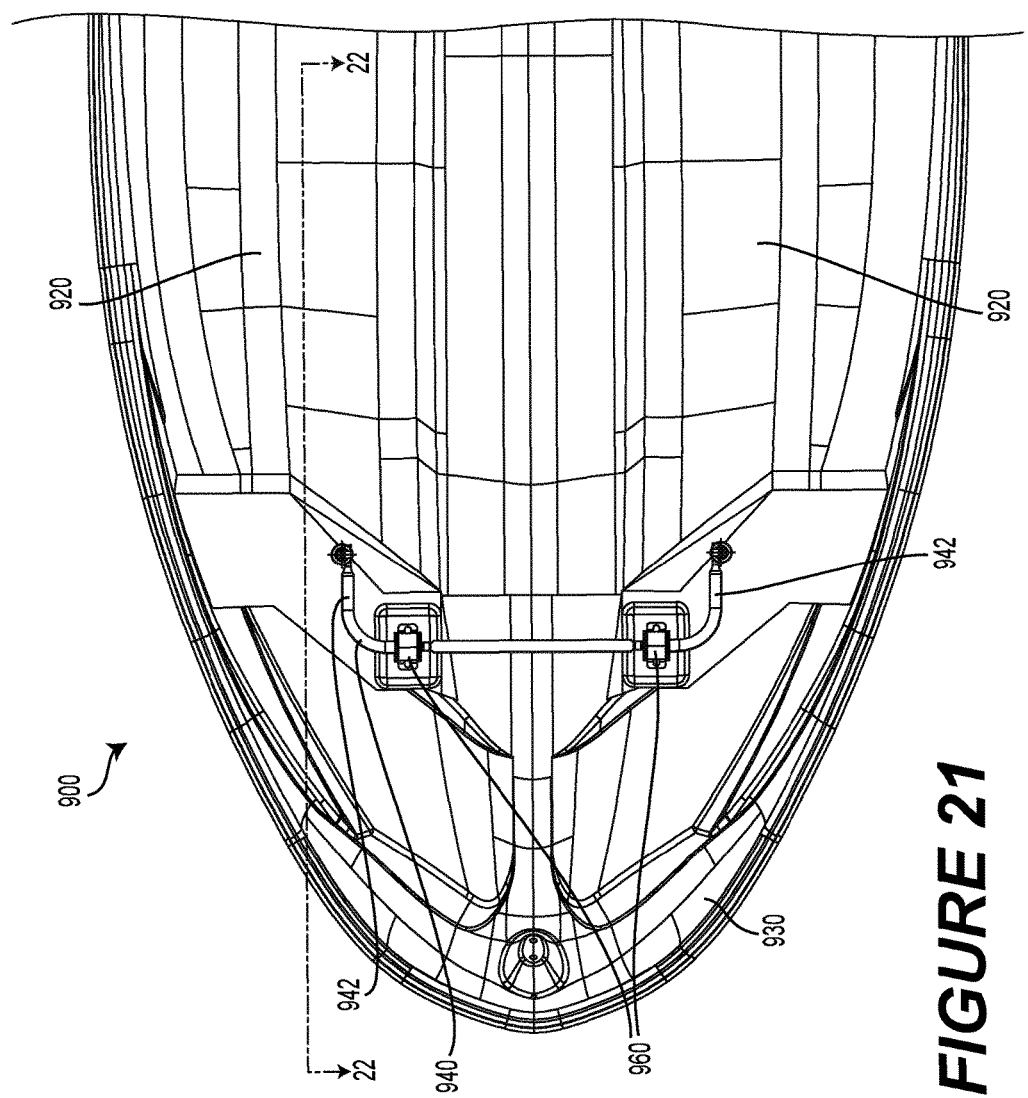
FIG. 21 is an enlarged, partial top plan view of the hull of FIG. 19.
Figure 22:
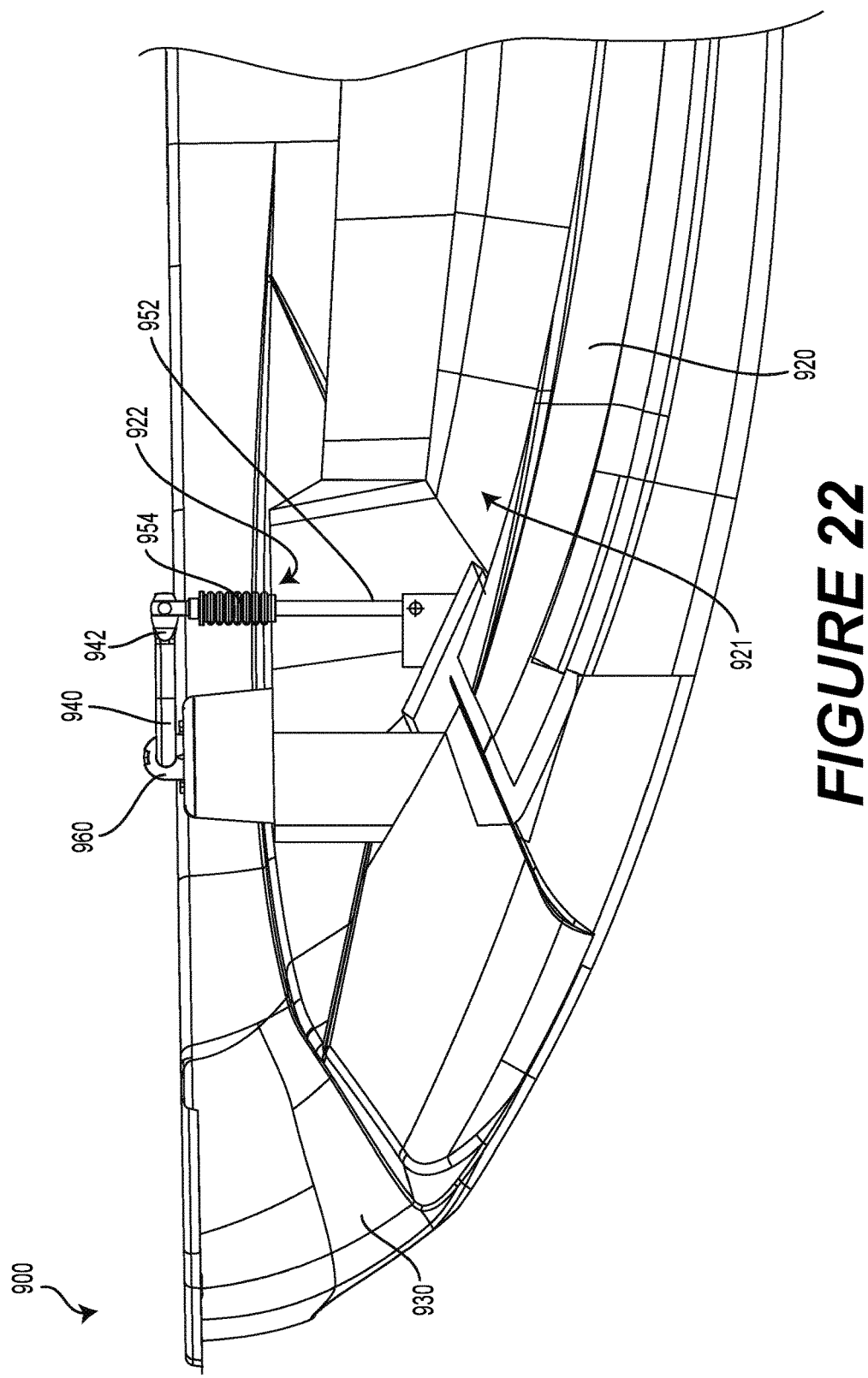
FIG. 22 is a cross-sectional view of the hull of FIG. 19, taken along line 22-22 of FIG. 21.

FIG. 18 shows another implementation of the present technology where the hull panel 820 is joined with the hull body 830 for a hull 800. In this non-limiting implementation, the rear end 893 of the hull panel 820 is integral with adjacent portions of the hull body 830. Represented by a dotted line, there is an integral portion 841 connecting the hull panel 820 to the hull body 830, where the hull panel 820 has not been physically separated from the hull body 830. The contour 842 represents an edge that is physically disconnected from the hull body 830. The hull panel 820 or portions thereof are sufficiently flexible to allow independent movement of the hull panel 820 and the hull body 830 along this contour. The integral portion 841 can, for example, form a living hinge that is also capable of a hinging movement, leaving the front portion 891 the greatest range of movement to absorb landing shocks from chop near the front of the hull 800.

With reference to FIGS. 19 to 22, another implementation of a hull 900 will be described, where hull panels 920 are connected via a stabilizing bar 940. A hull body 930 defines two hull recesses 921 into which the two hull panels 920 can recede upon being hit with chop and small waves, as with previous implementations.

Although not explicitly illustrated, each hull panel 920 is connected to a biasing member to bias the front portion of the hull panel 920 outward toward its position flush with the hull body 930, by applying a force outward from each hull recess 921. Upon being hit with chop and small waves, the biasing member will compress and allow each hull panel 920 to recede into the hull recess 921. It is contemplated that the biasing member in this implementation could be any of the above described biasing members (but is not limited to only the biasing members described herein).

The present implementation of hull 900 further includes the stabilizing bar 940 connected to the hull panels 920 and to a hull body 930 of the hull 900. The stabilizing bar 940 is specifically a generally U-shaped torsion bar 940, although other forms are possible. The stabilizing bar 940 is pivotably connected to the hull body 930 by two brackets 960, which allow a central portion of the stabilizing bar 940 to rotate and twist. Each bracket 960 includes a resilient bushing that surrounds the torsion bar 940. It is contemplated that the hull 900 could include more or fewer brackets 960. It is also contemplated that a different fixture could be implemented to connect the stabilizing bar 940 to the hull body 930.

Left and right end portions 942 of the stabilizing bar 940 extend outward from the brackets 960 and are connected to the left and right hull panels 920 respectively. A rigid member 952 is fastened between each end portion 942 and its corresponding hull panel 920. Each rigid member 952 extends through its corresponding recess surface 922, providing the connection between the stabilizing bar 940 and the hull panels 920. As such, the stabilizing bar 940 is generally protected from water entering the recesses 922. A sealing boot 954 is also included on each rigid member 952 to help seal the aperture (not shown) in the recess surface 922 through which the rigid member 952 passes, to prevent water from entering therethrough. It is contemplated that the stabilizing bar 940 could be differently configured such that it could be connected directly to the hull panels 920.

The stabilizing bar 940 acts to connect motion of one hull panel 920 to the other. When one hull panel 920 recedes into its recess 921, its rigid member 952 is also pushed into the hull 900, causing the corresponding end portion 942 of the stabilizing bar 940 to pivot upwards. This torsion on the stabilizing bar 940 in turn induces a similar movement of other rigid member 952, and thus causing the opposite hull panel 920 to recede into its recess 922 in a similar manner The communication of motion between the two hull panels 920 provided by the stabilizing bar 940 helps maintain a symmetric hydrodynamic form in the hull 900. In situations where chop or small waves are incident on only one side of the hull 900, for example, only the hull panel 920 receiving the waves will recede into its recess 922. Without the stabilizer bar 940, the hull 900 would effectively have an asymmetric hydrodynamic, which would cause the watercraft to veer away from its intended steering. With the stabilizer bar 940 keeping the two hull panels 920 more symmetrically compressed, the hull 900 can generally maintain a symmetric hydrodynamic form and steering complications due to asymmetric compression of the hull panels 920 can generally be avoided.

Modifications and improvements to the above-described implementation of the present technology may become apparent to those skilled in the art. The foregoing description is intended to be exemplary rather than limiting. The scope of the present technology is therefore intended to be limited solely by the scope of the appended claims.

What is claimed is:
1. A hull for a watercraft, comprising:
a hull body having:
   a first recess surface defining a first recess, and
   a second recess surface defining a second recess;
a first hull panel disposed at least in part in the first recess, a front portion of the first hull panel being movable between a first position and a second position:
   in the first position, the front portion of the first hull panel being at a first distance from the first recess surface,
   in the second position, the front portion of the first hull panel being at a second distance from the first recess surface, and
   the first distance being greater than the second distance;
a second hull panel disposed at least in part in the second recess, a front portion of the second hull panel being movable between a third position and a fourth position:
   in the third position, the front portion of the second hull panel being at a third distance from the second recess surface,
   in the fourth position, the front portion of the second hull panel being at a fourth distance from the second recess surface, and
   the third distance being greater than the fourth distance;
a first biasing member biasing the front portion of the first hull panel toward the first position;
a second biasing member biasing the front portion of the second hull panel toward the third position;
at least one first stopper preventing the front portion of the first hull panel from moving outwards of the first recess past the first position;
at least one second stopper preventing the front portion of the second hull panel from moving outwards of the second recess past the third position; and
a stabilizing bar for transferring motion between the first hull panel and the second hull panel, the stabilizing bar having a first end portion and a second end portion and being connected to:
   the hull body between the first end portion and the second end portion,
   the first hull panel near the first end portion, and
   the second hull panel near the second end portion.
2. The hull of claim 1, wherein:
in the first position, at least a portion of the first hull panel is aligned with portions of the hull body defining a first contour of the first recess; and
in the third position, at least a portion of the second hull panel is aligned with portions of the hull body defining a second contour of the second recess.
3. The hull of claim 1, wherein:
in the first position, at least a lateral side portion of the first hull panel is aligned with portions of the hull body defining a first contour of the first recess; and
in the third position, at least a lateral side portion of the second hull panel is aligned with portions of the hull body defining a second contour of the second recess.

4. The hull of claim 1, wherein:
a rear end of the first hull panel is joined with a portion of the hull body adjacent to a rear end of the first recess; and
a rear end of the second hull panel is joined with a portion of the hull body adjacent to a rear end of the second recess.

5. The hull of claim 1, wherein the stabilizer bar includes at least a generally U-shaped torsion bar pivotably connected to the hull body.

6. The hull of claim 5, further comprising:
a first rigid member connecting a first end portion of the U-shaped torsion bar to the first hull panel; and
a second rigid member connecting a second end portion of the U-shaped torsion bar to the second hull panel.

7. The hull of claim 6, wherein:
the first rigid member extends through the first recess surface; and
the second rigid member extends through the second recess surface.

8. The hull of claim 7, further comprising:
a first boot disposed on the first rigid member and connected to the hull body; and
a second boot disposed on the second rigid member and connected to the hull body.

9. The hull of claim 1, wherein the first and second biasing members include at least a resilient material.

10. The hull of claim 9, wherein:
the resilient material of the first biasing member is disposed between and connected to the first recess surface and the first hull panel, a lateral surface of the resilient material of the first biasing member generally following an outer edge of the first hull panel; and
the resilient material of the second biasing member is disposed between and connected to the second recess surface and the second hull panel, a lateral surface of the resilient material of the second biasing member generally following an outer edge of the second hull panel.

11. The hull of claim 9, wherein the resilient material of the first and second biasing members is a closed-cell foam.

12. The hull of claim 1, wherein the first and second hull panels are flexible.

13. The hull of claim 1, wherein the first and second biasing members include at least an air spring.

14. The hull of claim 1, wherein the first and second biasing members include at least a spring and damper system.

15. The hull of claim 1, wherein the first and second biasing members include at least a resilient mount shock absorber.

16. The hull of claim 1, further comprising:
a rearward portion of the first hull panel rearward of the front portion of the first hull panel and being movable between a fifth position and a sixth position:
in the fifth position, the rearward portion of the first hull panel is at a fifth distance from the first recess surface,
in the sixth position, the rearward portion of the first hull panel is at a sixth distance from first recess surface, and
the fifth distance is greater than the sixth distance; and
a rearward portion of the second hull panel rearward of the front portion of the second hull panel and being movable between a seventh position and an eighth position:
in the seventh position, the rearward portion of the second hull panel is at a seventh distance from the second recess surface,
in the eighth position, the rearward portion of the second hull panel is at an eighth distance from second recess surface, and
the seventh distance is greater than the eighth distance.

17. The hull of claim 16, wherein:
a difference between the first distance and the second distance is greater than a difference between the fifth distance and the sixth distance; and
a difference between the third distance and the fourth distance is greater than a difference between the seventh distance and the eighth distance.

18. A watercraft comprising:
a hull including:
a hull body having:
a first recess surface defining a first recess, and
a second recess surface defining a second recess;
a first hull panel disposed at least in part in the first recess, a front portion of the first hull panel being movable between a first position and a second position:
in the first position, the front portion of the first hull panel being at a first distance from the first recess surface,
in the second position, the front portion of the first hull panel being at a second distance from the first recess surface, and
the first distance being greater than the second distance;
a second hull panel disposed at least in part in the second recess, a front portion of the second hull panel being movable between a third position and a fourth position:
in the third position, the front portion of the second hull panel being at a third distance from the second recess surface,
in the fourth position, the front portion of the second hull panel being at a fourth distance from the second recess surface, and
the third distance being greater than the fourth distance;
a first biasing member biasing the front portion of the first hull panel toward the first position;
a second biasing member biasing the front portion of the second hull panel toward the third position;
at least one first stopper preventing the front portion of the first hull panel from moving outwards of the first recess past the first position;
at least one second stopper preventing the front portion of the second hull panel from moving outwards of the second recess past the third position; and
a stabilizing bar for transferring motion between the first hull panel and the second hull panel, the stabilizing bar having a first end portion and a second end portion and being connected to:
the hull body between the first end portion and the second end portion,
the first hull panel near the first end portion, and
the second hull panel near the second end portion;
a deck disposed on the hull;
a propulsion system connected to at least one of the hull and the deck; and
a motor operatively connected to the propulsion system.

* * * * *